(12) United States Patent
Miernik et al.

(10) Patent No.: US 10,965,572 B2
(45) Date of Patent: Mar. 30, 2021

(54) DATA TRANSFER CONTROL

(71) Applicant: Bank of America Corporation, Charlotte, NC (US)

(72) Inventors: Jerzy Miernik, Allen, TX (US); Manu Jacob Kurian, Dallas, TX (US); Qishan Cai, Frisco, TX (US); Lixian Huang, Plano, TX (US); Saritha Prasad Vrittamani, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 801 days.

(21) Appl. No.: 15/583,748

(22) Filed: May 1, 2017

(65) Prior Publication Data

US 2018/0316588 A1    Nov. 1, 2018

(51) Int. Cl.
    *H04L 12/26*    (2006.01)
(52) U.S. Cl.
    CPC ......... *H04L 43/0888* (2013.01); *H04L 43/16* (2013.01)
(58) Field of Classification Search
    CPC ..... H04L 43/0888; H04L 43/16; H04L 41/16; H04L 41/5019
    See application file for complete search history.

(56) References Cited

U.S. PATENT DOCUMENTS

| | | | |
|---|---|---|---|
| 6,842,783 B1 | 1/2005 | Boivie et al. | |
| 6,873,601 B1 * | 3/2005 | Chow | H04W 24/00 370/254 |
| 6,970,424 B2 | 11/2005 | Fawaz et al. | |
| 7,272,115 B2 | 9/2007 | Maher, III et al. | |
| 7,843,831 B2 | 11/2010 | Morrill et al. | |
| 7,865,584 B2 * | 1/2011 | Grossner | H04L 43/00 709/223 |
| 7,920,472 B2 | 4/2011 | Porat | |

(Continued)

OTHER PUBLICATIONS

"Rapid: An End-System Aware Protocol for Intelligent Data Transfer Over Lambda Grids." Banerjee et al. Parallel and Distributed Processing Symposium, 2006. IPDPS 2006. 20th International.

(Continued)

*Primary Examiner* — Chris Parry
*Assistant Examiner* — Adam A Cooney
(74) *Attorney, Agent, or Firm* — Banner & Witcoff, Ltd.; Michael Springs

(57) ABSTRACT

Aspects of the disclosure provide effective, efficient, scalable, and convenient technical solutions that address and overcome technical challenges associated with transferring data files in a distributed network having multiple data sources and multiple data destinations. In some examples, a computer system, device, platform, or the like is configured to control the data transfers between other computing systems, devices, platforms, or the like in a computing environment. Controlling the data transfer includes, in some examples, detecting the data transfer between a data source and a data destination, evaluating a data transfer condition associated with the data transfer, determining a data transfer instruction based, at least in part, on the data transfer condition, and providing the data transfer instruction to the data source. The data source then transfers the data to the data destination in accordance with the data transfer instruction.

25 Claims, 12 Drawing Sheets

(56) References Cited

U.S. PATENT DOCUMENTS

| | | |
|---|---|---|
| 8,374,090 B2 | 2/2013 | Morrill et al. |
| 8,539,074 B2 | 9/2013 | Bartfai-Walcott et al. |
| 8,738,690 B2 | 5/2014 | Dalela |
| 8,825,885 B2 | 9/2014 | Kruse et al. |
| 8,838,955 B2 | 9/2014 | Boring et al. |
| 8,856,368 B2 | 10/2014 | Bacher et al. |
| 8,874,772 B2 | 10/2014 | Boldt |
| 8,904,037 B2 | 12/2014 | Haggar et al. |
| 8,918,392 B1 | 12/2014 | Brooker et al. |
| 8,918,537 B1 | 12/2014 | Sandstrom et al. |
| 8,972,527 B2 | 3/2015 | Yen |
| 8,984,269 B2 | 3/2015 | Ferris |
| 9,009,345 B1 | 4/2015 | Carbone et al. |
| 9,094,302 B2 | 7/2015 | Nguyen et al. |
| 9,191,282 B2 | 11/2015 | Kakadia et al. |
| 9,191,283 B2 | 11/2015 | Bartfai-Walcott et al. |
| 9,237,112 B2 | 1/2016 | Stanwood et al. |
| 9,338,065 B2 | 5/2016 | Vasseur et al. |
| 9,544,202 B2 | 1/2017 | Yenduri et al. |
| 2002/0112079 A1 | 8/2002 | Yamamoto |
| 2002/0184371 A1 | 12/2002 | Elonen et al. |
| 2003/0046415 A1 | 3/2003 | Kaijyu et al. |
| 2004/0019690 A1 | 1/2004 | Cardno et al. |
| 2004/0205208 A1 | 10/2004 | Koponen et al. |
| 2004/0215800 A1 | 10/2004 | Shinomiya |
| 2005/0044250 A1* | 2/2005 | Gay .................. H04L 29/06 709/230 |
| 2005/0081116 A1* | 4/2005 | Bejerano ......... H04L 41/0677 714/47.2 |
| 2006/0133428 A1* | 6/2006 | Guthrie ............... H04L 47/10 370/519 |
| 2006/0206621 A1 | 9/2006 | Toebes et al. |
| 2007/0198218 A1 | 8/2007 | Sankala et al. |
| 2008/0040501 A1* | 2/2008 | Harrang ............... H04L 1/0002 709/232 |
| 2008/0104264 A1 | 5/2008 | Duerk et al. |
| 2011/0047287 A1* | 2/2011 | Harrang .................. H04L 45/00 709/235 |

OTHER PUBLICATIONS

"Best Practices in Managed File Transfer." Aberdeen Group, Inc. Apr. 2013.

"Managing Files for the Hybrid Cloud—Use Cases, Challenges and Requirements." Oracle Technical White Paper. Jun. 2014.

"Oracle Managed File Transfer." Oracle Data Sheet. 2014.

"Bandwidth Management." Retrieved from [https://en.wikipedia.org/wiki/Bandwidth_management] on Mar. 17, 2017.

"Managed File Transfer." Retrieved from [https://en.wikipedia.org/wiki/Managed_file_transfer] on Mar. 17, 2017.

"Background Intelligent Transfer Service." Retrieved from [https://en.wikipedia.org/wiki/Background_Intelligent_Transfer_Service] on Mar. 17, 2017.

"Scheduling (Computing)." Retrieved from [https://en.wikipedia.org/wiki/Scheduling_(computing)] on Mar. 17, 2017.

"Data Transfer Scheduling With Advance Reservation and Provisioning." Balman, Mehmet. Louisiana State University and Agricultural and Mechanical College. Department of Computer Science. Aug. 2010.

"Data Transfer Scheduling and Optimization as a Service." Kosar et al. ScienceCloud '13. Jun. 17, 2013.

"Multiple bulk data transfers scheduling among datacenters." Wang et al. Elsevier B.V. Computer Networks, vol. 68, pp. 123-137. Feb. 27, 2014.

* cited by examiner

DATA TRANSFER CONTROL

TECHNICAL FIELD

Aspects of the disclosure generally relate to computer networks and multicomputer data transferring in electrical computer and digital processing systems in which data is transferred between computers. In particular, various aspects of the disclosure relate to using a computer to regulate the operation of other computers in a computing environment for the purposes of, among others, transfer speed regulating, congestion avoiding, alternate path routing, and prioritized data routing.

BACKGROUND

Large enterprise organizations may deploy, operate, maintain, and use many different computing systems and computing devices which may continually exchange data in order to provide enterprise-focused and/or client-focused services. In order to improve the efficiency with which the computing systems and devices operate, organizations often seek out ways to make operation of those computing systems and devices more efficient, streamlined, and the like. However, individual computing systems/devices may operate without regard to the operations of other computing systems/devices in the computing environment. This is the case, for example, with respect to data transfer operations between computing systems/devices. A computing system/device might execute its data transfers without regard to other data transfers that are taking place or need to take place within the computing environment. As a result, conflicting data transfers, delayed data transfers, and failed data transfers are all challenges encountered when executing data transfers in an enterprise-wide computing environment.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome technical challenges associated with transferring data files in a distributed network having multiple data sources and multiple data destinations.

In some examples, a computer system, device, platform, or the like may be configured to control the data transfers between other computing systems, devices, platforms, or the like in a computing environment. Controlling the data transfer may include detecting the data transfer between a data source and a data destination, evaluating a data transfer condition associated with the data transfer, determining a data transfer instruction based, at least in part, on the data transfer condition, and providing the data transfer instruction to the data source. The data source may then transfer the data to the data destination in accordance with the data transfer instruction.

The data transfer instructions may also be based on a machine learning dataset. The machine learning dataset may be generated from historical data transfer conditions and indicate patterns, correlations, and the like between previous data transfers and previous data transfer conditions. Data transfer conditions include statuses, aspects, characteristics, and the like of the data, data sources, data destinations, networks, and the like in the computing environment in which the data transfers occur. Data transfer instructions include instructions indicating when, where, and how to transfer the data between a data source and a data destination.

These aspects, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
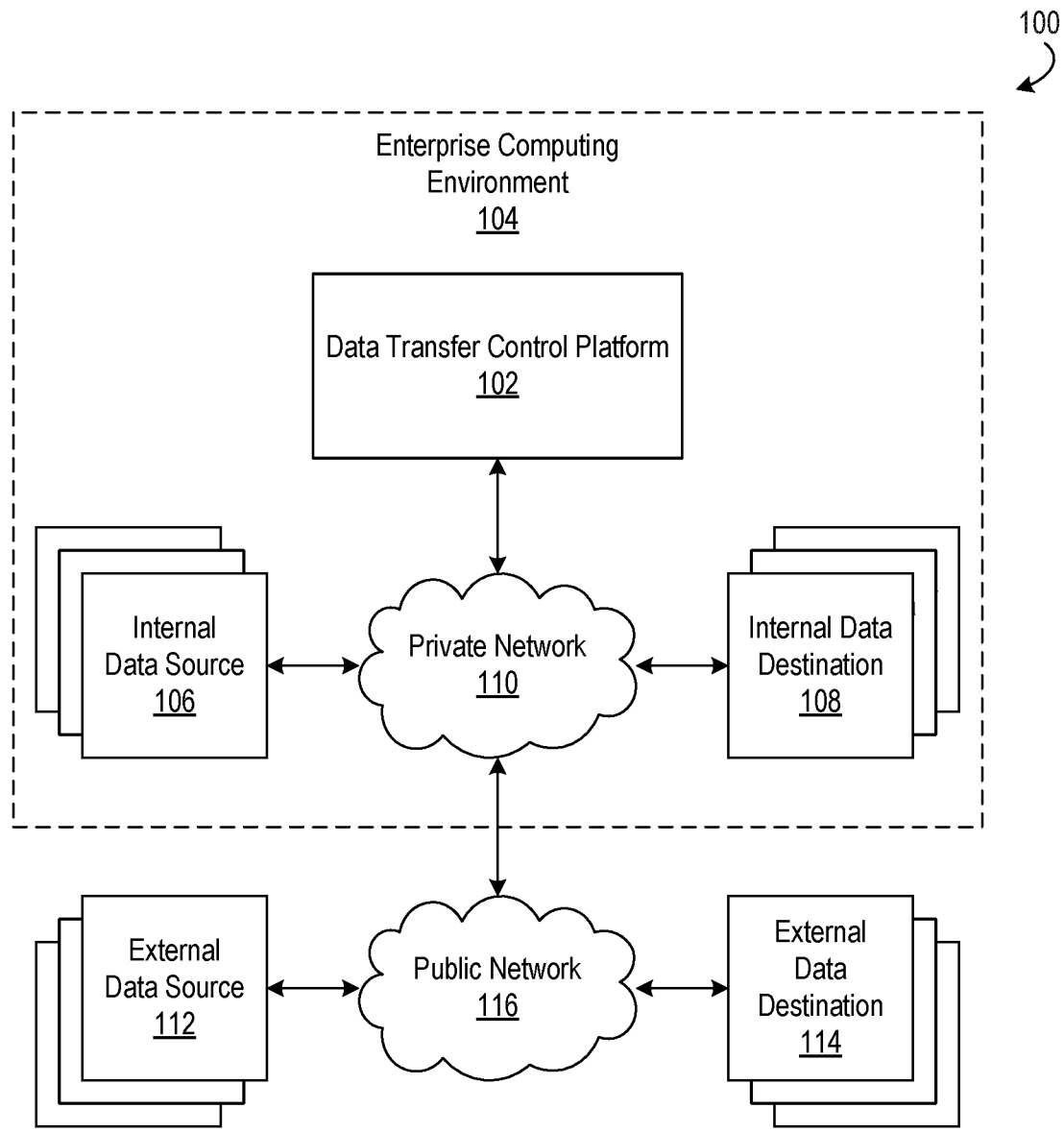
FIG. 1 depicts an illustrative computing environment for implementing and using a data transfer control platform in accordance with aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. These connections are general and, unless specified otherwise, may be direct or indirect, wired or wireless, and that the specification is not intended to be limiting in this respect.

Aspects of this disclosure relate to controlling the transfer of data between a data source and a data destination in a networked computing environment. As used herein, transferring data includes transmitting data, sending data, moving data, copying data, or otherwise providing data from a data source to a data destination. As described in further detail below, controlling the transfer of data includes controlling what data is transferred, where the data is transferred, when the data is transferred, and how the data is transferred. The control exercised over the transfer of data is based on various data transfer conditions which may relate to the data itself, the destination of the data, and/or the network through which the data is transferred. In addition, machine learning techniques may be employed to compile a machine learning dataset related to data transfers in a particular computing environment, and that machine learning dataset may be utilized to control data transfers in that computing environment. In this way, a more efficient execution of data transfers can be achieved.

In some conventional systems lacking any kind of mechanism to control data transfers, components may compete for resources and operate independently without regard to the condition of the computing environment in which the data transfers are executed. In one example, a transfer of a set of files may be initiated without regard to whether the target has the storage capacity to store the files to be transferred. If the target lacks the storage capacity to store those files, then the file transfer will likely fail to complete successfully. In another example, a transfer of data to be processed by the target may be initiated without regard to the processing throughput of the target. If the data is transferred to the target faster than the target can process it, then resources may be wasted by transferring data that cannot yet be consumed. As a further example, a data transfer may be initiated without regard to an upcoming data transfer that should take precedence over the current data transfer. If a relatively high priority data transfer is delayed by a relatively low priority data transfer, then data transfer service level agreements may not be met.

Accordingly, aspects described herein provide for exercising control over the data transfers occurring in a computing environment in order to achieve a more efficient execution of those data transfers. As noted above, components may execute data transfers independently without regard to other components of the computing environment in some conventional systems. The techniques described herein, however, take a global view of a computing environment in order to apply some intelligence to the manner in which data transfers occur. For example, various conditions associated with the computing environment, the components transferring and receiving the data, and/or the network through which the data is transferred may be considered and utilized to determine instructions associated with executing data transfers. Such instructions may include instructions for scheduling data transfers, parceling the data to be transferred, selecting a particular destination for the data, routing the data along a particular network path, and implementing precedence between data transfers. Furthermore, the conditions may be monitored over time and analyzed to compile a machine learning dataset which also may be utilized to determine the instructions associated with executing the data transfers. For example, historical data associated with the conditions may be analyzed to identify patterns associated with the conditions or the data transfers themselves. By employing the techniques described herein, data transfers may be executed more efficiently with less wasted resources.

These and various other aspects will be discussed in further detail below.

FIG. 1 depicts an example computing environment 100 for implementing and using a data transfer control platform in accordance with aspects described herein. The computing environment 100, in this example, includes various computing systems and computing devices. For example, the computing environment 100 includes a data transfer control platform 102 residing within an enterprise computing environment 104. The data transfer control platform 102, in this example, is in signal communication with both internal data sources 106 and internal data destinations 108 via a private network 110 of the enterprise computing environment 104. The data sources 106 and data destinations 108 are referred to as "internal" data sources and destinations, respectively, simply for convenience to indicate their status as components of the enterprise computing environment 104. The data transfer control platform 102, in this example, is also in signal communication with both external data sources 112 and external data destinations 114 via a public network 116. The data sources 112 and data destinations 114 are similarly referred to as "external" data sources and destinations, respectively, simply for convenience to indicate their status as components that are not part of the enterprise computing environment 104. In addition, it should be appreciated that the enterprise computing environment 104 is described simply by way of example to illustrate various principles associated with controlling data transfers and that the techniques described herein may be likewise employed in additional and alternative types of computing environments, such as an individual's personal computing environment.

The data transfer control platform 102, in this example, is configured to control data transfers between the data sources 106 or 112 and the data destinations 108 or 114. Accordingly, the data transfer control platform 102 may control data transfers between an internal data source 106 and an internal data destination 108, an internal data source 106 and an external data destination 114, an external data source 112 and an external data destination 114, and an external data source 112 and an internal data destination 108. It should be appreciated that a component may be considered both a data source and a data destination depending on whether it is transferring or receiving data during a data transfer. In addition, controlling a data transfer as described herein includes providing an instruction to a data source which executes a data transfer in accordance with the instruction received. For convenience, such an instruction is referred to herein as a data transfer instruction.

The data transfer control platform 102 generates the data transfer instructions based on one or more conditions associated with the computing environment in which the data transfers occur. As noted above, these conditions include conditions associated with the data itself, the network through which the data transfers occur, and/or the data destinations 108 or 114. In general, the conditions the data transfer control platform 102 considers when generating the data transfer instructions include conditions that can affect a choice of when to execute a data transfer (e.g., at a scheduled time), where to transfer the data to (e.g., a specified data destination), how to transfer the data (e.g., in parcels, via a specified network path), and the like. In this way, the data transfer control platform 102 may apply some intelligence when creating the data transfer instruction based on the observed data transfer condition. Again for convenience, such a condition is referred to herein as a data transfer condition.

In various circumstances, data transfer conditions may or may not be known to the data transfer control platform 102 a priori, that is, prior to execution of a data transfer. Accordingly, the data transfer control platform 102, in some example implementations, may be configured to monitor various data transfer conditions regardless of the existence of any current or upcoming data transfers. Additionally or alternatively, the data transfer control platform 102 may be configured to determine one or more data transfer conditions in an ad hoc fashion in response to detecting a data transfer. The data transfer control platform 102 may thus be configured to inspect the data sources 106 or 112, the data destinations 108 or 114, and the networks 110 or 116. Such inspection may be achieved in various ways. For example, the data transfer control platform 102 may utilize an application programming interface (API) to obtain information characterizing aspects of the data sources 106 or 112, the data destinations 108 or 114, or the networks 110 or 116. The information obtained may be stored for further analysis in order to compile a machine learning dataset which may be considered when generating the data transfer instructions. The data transfer control platform 102 may be configured to evaluate the data transfer conditions in various ways including, for example, directly measuring the data transfer condition, obtaining information about the data transfer condition from another component that has measured it, estimating or otherwise predicting the data transfer condition (e.g., based on a machine learning dataset), and the like. Additional and alternative ways of evaluating the data transfer condition will be appreciated with the benefit of this disclosure.

The data transfer conditions include a wide variety of conditions that can affect when, where, and how to execute a data transfer. Examples of data transfer conditions associated with a data source 106 or 112 include conditions pertaining to the size of the data to be transferred and an importance of the data to be transferred. The size of the data may be indicated in various ways including, for example, a file size of an individual data file, a total file size of multiple data files, a total number of records (e.g., database records), a total number of line items, and the like. The importance of the data also may be indicated in various ways including, for example, a priority for the data, a deadline by which the data should to be transferred. The priority of the data may be indicated in various ways including, for example, quantitatively (e.g., 1-5 with "5" being the highest priority), qualitatively (e.g., "high," "medium," or "low"), and the like. The deadline for transferring the data also may be indicated in various ways including, for example, a specific date and/or time, within x amount of time (e.g., milliseconds, seconds, minutes, hours, days) of requesting or otherwise initiating a data transfer, no later than a specified date and/or time, and the like. Examples of data transfer conditions associated with a data destination 108 or 114 include conditions pertaining to computing resource utilization, processing throughput, and the like. Examples of computing resource utilization include storage capacity (e.g., at a data store), volatile memory usage, CPU usage, and the like. Processing throughput includes an amount of data the data destination 108 or 114 can process (or consume) in a given amount of time. Examples of data transfer conditions associated with a network 110 or 116 include conditions pertaining to the bandwidth available on the network, the amount of traffic on the network, the latency of the network, and the like. Data transfer conditions also include conditions pertaining to whether or not a data transfer is currently executing and whether or not a data transfer is expected to occur in the future. Data transfer conditions may also thus include conditions pertaining to aspects of a currently executing data transfer and an upcoming data transfer including, for example, an anticipated time (or duration) to complete the current or upcoming data transfer. Additional and alternative examples of data transfer condition will be appreciated with the benefit of this disclosure.

As mentioned above, the data transfer computing platform 102, in this example, is configured to detect a data transfer. Detecting a data transfer as described herein includes determining that a data source 106 or 112 is currently executing a data transfer and determining that a data source will execute a data transfer in the future. Accordingly, the data transfer control platform 102 may be configured to detect current and upcoming data transfers between a data source 106 or 112 and a data destination 108 or 114. Detecting a data transfer may be achieved in various ways. For example, in some implementations, the data source 106 or 112 may notify the data transfer control platform 102 of its intention to execute a data transfer, e.g., by providing a notification prior to a data transfer or by providing a schedule of upcoming data transfers. Such a notification may include details pertaining to the data transfer, e.g., a description of the data to be transferred, a size of the data to be transferred, the intended data destination, and the like. As another example, the data transfer control platform 102 may include a monitoring mechanism installed at the data sources 106 or 112 that monitor system calls associated with data transfers and provides notifications in response to detecting such system calls. As a further example, the data transfer control platform 102 may monitor the network 110 or 116 through which the data transfers occur in order to detect data transfers. The data transfer control platform 102 may also be configured to employ combinations of these and other techniques to detect data transfers.

As also mentioned above, the data transfer computing platform 102, in this example, is configured to determine a data transfer instruction based, at least in part, on the data transfer condition evaluated. It will be appreciated that, in some example scenarios, the data transfer computing platform 102 may determine the data transfer instruction based on multiple data transfer conditions. In general, a data transfer instruction may indicate one or more of when to transfer the data, where to transfer the data to, and how to transfer the data.

The data transfer control platform 102 may thus utilize data transfer instructions that indicate when to transfer the data. In this way, the data transfer control platform 102 may schedule data transfers between a data source 106 or 112 and a data destination 108 or 114, e.g., by specifying a date and/or time at which the data transfer occur or by specifying an amount of time the data source should wait before executing the data transfer. The data transfer control platform 102 may schedule a data transfer based on, for example, an anticipated (or estimated) amount of time needed to complete a current data transfer, upcoming data transfers that have already been scheduled, a date and/or time the data destination is expected to have a relatively low utilization of computing resources (e.g., CPU usage, storage capacity, and the like). Historical transfer times, historical scheduled data transfers, and historical measurements of computing resource utilization may be stored and analyzed to obtain a machine learning dataset that indicates patterns associated with data transfers in the computing environment. The data transfer control platform 102 may thus employ this machine learning dataset when determining a data transfer instruction that schedules a data transfer by a data source 106 or 112, e.g., by scheduling a data transfer in response to patterns observed in the machine learning dataset with respect to when data transfers are anticipated to occur, when the utilization of the computing resources of the data destination are anticipated to be relatively high or low, failures of previous data transfers and the correlation of such failures with aspects of the computing environment, and the like.

The data transfer control platform 102 may also utilize data transfer instructions that indicate where to transfer the data. In this way, the data transfer control platform 102 may route data to particular data destinations 108 or 114, e.g., by specifying a data destination to which a data source 106 or 112 should transfer the data. The data transfer control platform 102 may similarly route data to a particular data destination based on aspects associated with current or upcoming data transfers, utilization of computing resources at the data destinations, and the like. The data transfer control platform 102 may likewise utilize the machine learning dataset to select a data destination 108 or 114 to which a data source 106 or 112 should transfer data. It will be appreciated that, in some scenarios, the data transfer control platform 102 may select an alternative data destination 108 or 114 to transfer the data to based on an observed data transfer condition (e.g., a relatively high utilization of computing resources at an initially selected data destination), and instruct a data source 106 or 112 to transfer the data to the alternative data destination (e.g., having a relatively low utilization of computing resources).

The data transfer control platform 102 may further utilize data transfer instructions that indicate how to transfer the data. How the data should be transferred includes, for example, a particular network path that should be utilized to transfer the data and a parceling of the data such that portions of the data are transmitted in stages. In this way, the data transfer control platform 102 may control routing of a data transfer along a particular network path, e.g., by specifying the network path a data source 106 or 112 should utilize to transfer the data. For example, the data transfer control platform 102 may instruct a data source 106 or 112 to utilize a network path having a relatively low network latency in order to ensure a timely transfer of the data to a data destination 108 or 114. In addition, the data transfer control platform 102 may control parceling of the data, e.g., by specifying a size of each parcel of the data, a total number of parcels to divide the data into, and the like. For example, the data transfer control platform 102 may instruct a data source 106 or 112 to parcel the data into multiple parcels of size x for transfer to a data destination 108 or 114 in multiple stages. As another example, the data transfer control platform 102 may instruct a data source 106 or 112 to parcel the data into x parcels for transfer to a data destination 108 or 114 in x stages. It will be appreciated that the size specified by the data transfer control platform 102 may be the same for each data parcel or different between data parcels (e.g., size x for some data parcels and size y for other data parcels).

The data sources 106 and 112 as well as the data destinations 108 and 114 may include various types of computing devices. Examples of data sources and data destinations include servers (e.g., application servers, web servers, data servers), storage devices and systems (e.g., databases, data repositories, data warehouses), user-operated devices (e.g., desktop, laptop, palmtop, and tablet computing devices, mobile cellular telephones, terminal workstations, kiosks, gaming consoles) "smart" devices, and the like. Some specific examples of data sources and data destinations include automated teller machines (ATMs), point-of-sale (POS) devices, computing devices associated with various types of computing systems (e.g., financial trading systems, clearinghouse systems, data backup systems, data recovery systems, extract-transform-load (ETL) systems), and the like. Additional and alternative examples of data sources and data destinations will be appreciated with the benefit of this disclosure.

As mentioned above, the computing environment 100, in this example, includes private and public networks 110 and 116 that interconnect the data transfer control platform 102 with the data sources 106 and 112 and the data destinations 108 and 114. Private network 190 and/or public network 195 may include one or more sub-networks (e.g., Local Area Networks (LANs), Wide Area Networks (WANs), or the like). Private network 110 may be associated with a particular organization (e.g., a corporation, financial institution, educational institution, governmental institution, or the like) and may interconnect one or more computing devices associated with the organization. For example, the data transfer control platform 102, the internal data sources 106, and the internal data destinations 108 may be associated with an organization (e.g., a financial institution), and the private network 110 may be associated with and/or operated by the organization, and may include one or more types of networks (e.g., LANs, WANs, virtual private networks (VPNs), or the like) that interconnect the data transfer control platform, internal data sources, internal data destinations, and one or more other computing devices and/or computer systems that are used by, operated by, and/or otherwise associated with the organization. The public network 116 may connect the private network 110 and/or one or more computing devices connected thereto (e.g., the data transfer control platform 110, internal data sources 106, and/or internal data destinations 108) with one or more networks and/or computing devices that are not associated with the organization. For example, one or more of the external data sources 112 and/or the external data destinations 114 might not be associated with an organization that operates the private network 110 (e.g., because the external data source and/or external data destination may be owned, operated, and/or serviced by one or more entities different from the organization that operates the private network 110, such as one or more customers of the organization and/or vendors of the organization, rather than being owned and/or operated by the organization itself or an employee or affiliate of the organization), and the public network 116 may include one or more networks (e.g., the Internet, a cellular network) that connect the external data sources 112 and/or the external data destinations 114 to the private network 110 and/or one or more computing devices connected thereto (e.g., data transfer control platform 102, internal data sources 106, and internal data destinations 108). The data transfer control platform 102 may thus provide data transfer instructions to the external data sources 112 via the public network 116.

Figure 2:
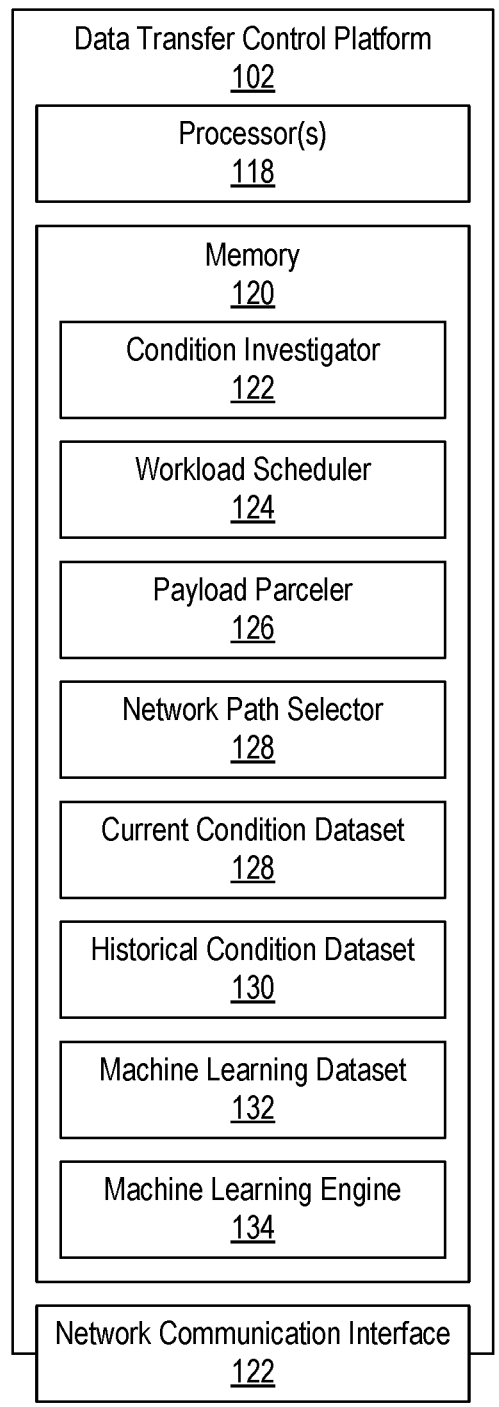
FIG. 2 depicts an illustrative example of a data transfer control platform in accordance with aspects described herein.

Referring now to FIG. 2, the example data transfer control platform 102 of FIG. 1 is illustrated in further detail. The data transfer control platform 102, in this example, includes one or more processors 118, memory 120, and a communication interface 122. A data bus may interconnect the processor(s) 118, memory 120, and communication interface 122. The communication interface 122 may be a network interface configured to support communication between the data transfer control platform 102 and one or more networks (e.g., the private network 110, the public network 116, or the like). The memory 120 include computer-executable instructions that when executed by the processor(s) 118 cause the data transfer control platform 102 to perform one or more functions described herein. In some instances, the instructions may be stored by and/or maintained in different memory units of the data transfer control platform 102 and/or by different computing devices that may form and/or otherwise make up the data transfer control platform. For convenience, the present disclosure describes the instructions of the data transfer control platform 102 according to their logical groupings based on the functionality they provide. For example, the data transfer control platform 102 may be described as having logical components for investigating the data transfer conditions of a computing environment, scheduling a data transfer, and parceling data to be transferred into multiple data parcels to transfer in multiple stages. In this regard, the memory 120 of the data transfer control platform 102, in this example, may be described as storing and/or including a condition investigator 122, a workload scheduler 124, a payload parceler 126, and a network path selector 128. Additional and alternative sets of instructions stored in the memory 120 of the data transfer control program 102 will be appreciated with the benefit of this disclosure.

The condition investigator 122 corresponds to instructions that cause or enable the data transfer control platform 102 to, for example, investigate the data transfer conditions of the computing environment. For example, the condition investigator may investigate aspects and/or characteristics of the data source that transfer the data, the aspects and/or characteristics of the data to be transferred, investigate the status and/or characteristics of the network(s) used to transfer the data, and/or investigate the status and/or characteristics of the data destination the data is to be transferred to). The condition investigator 122 may investigate multiple data transfer conditions for a data transfer which the data transfer control platform 102 may consider when determining what data transfer instruction to provide to a data source. To evaluate the data transfer conditions, the condition investigator 122 may analyze or otherwise consider a current condition dataset 128, a historical condition dataset 130, and/or a machine learning dataset 132, each of which will be discussed in further detail below.

The workload scheduler 124 corresponds to instructions that cause or enable the data transfer control platform 102 to, for example, determine a time to execute a data transfer between a data source and a data destination and provide a data transfer instruction to a data source that indicates the time the data source should execute the data transfer. The scheduled time may be a time that is preferred in favor of another time in which the preference for the scheduled time is based on some evaluated criteria. For example, the scheduled time to execute a data transfer may be a time at or during which, e.g., a network latency on the network or the utilization of a computing resource at the data destination is anticipated to be better than some other time. The workload scheduler 124 may also correspond to instructions that cause or enable the data transfer control platform to, for example, provide data transfer control instructions to a data source that pause and/or resume a currently executing data transfer (e.g., in response to determining that a new data transfer has a higher priority or needs to be delivered by a certain deadline). The data transfer instructions provided by the workload scheduler 124 may be based on the current condition dataset 128, historical condition dataset 130, and/or machine learning dataset 132.

The payload parceler 126 corresponds to instructions that cause or enable the data transfer platform 102 to, for example, determine how to parcel the data to be transferred from a data source to a data destination. For example, the payload parceler 126 may select a total number of data parcels the data to be transferred should be divided into and/or a size of one or more of the data parcels. The payload parceler 126 may also correspond to instructions that cause or enable the data transfer control platform 102 to provide data transfer instructions to a data source indicating a total number and/or size of the data parcels the data source should divide the data into for transfer to a data destination in multiple stages. The data transfer instructions provided by the payload parceler 126 likewise may be based on the current condition dataset 128, historical condition dataset 130, and/or machine learning dataset 132.

The network path selector 128 corresponds to instructions that cause or enable the data transfer platform 102 to, for example, select a network path along which to transfer the data from a data source to a data destination. The selected network path may be a network path that is preferred in favor of another network path in which the preference for the selected time is based on some evaluated criteria. For example, the selected network path may be a network path having, e.g., a network latency, amount of traffic, or available bandwidth that is determined or anticipated to be better than that of another network path. The data transfer instructions provided by the network path selector 128 again may be based on the current condition dataset 128, historical condition dataset 130, and/or machine learning dataset 132.

As mentioned above, the data transfer instructions provided by the data transfer control platform 102 may be based on the current condition dataset 128, historical condition dataset 130, and/or machine learning dataset 132 stored in its memory 120. As used herein, the current condition dataset 128 includes condition data that characterizes a data transfer condition that is contemporaneous with a data transfer such that the data transfer condition might affect execution of the data transfer. As also used herein, the historical condition dataset 130 includes condition data that characterizes previous data transfer conditions that are not contemporaneous with a data transfer and therefore would not affect execution of the data transfer. It will be appreciated, however, the data transfer control platform may retain current condition data (e.g., for subsequent machine learning analysis). Accordingly, current condition data may evolve into historical condition data once the corresponding data transfer condition(s) change in the computing environment. The current condition data may thus characterize a current context of the computing environment in which a data transfer is or will be execute. Similarly, the historical condition data may characterize historical contexts of the computing environment.

The current condition dataset 128 and the historical condition dataset 130 respectively include condition data characterizing a variety of current and historical data transfer conditions in the computing environment 100. Examples of current condition data include service level agreements that must be met for a data source (e.g., specified deadlines, priority levels, and the like), a measurement of the size of the data to be transferred (e.g., file size, number of files, number of records, and the like), a measurement of the current network status (e.g., latency, traffic, available bandwidth, and the like), and a measurement of a computing resource utilization at a data destination (e.g., storage capacity, volatile memory available, CPU usage, and the like). Examples of historical condition data similarly include historical measurements of transferred data sizes, historical measurements of network status, and historical measurements of computing resource utilization. Additional and alternative examples of current and historical condition data will be appreciated with the benefit of this disclosure.

Furthermore, the current condition dataset 128 and/or the historical condition dataset 130 may be used to generate the machine learning dataset 132 (e.g., by a machine learning engine). The memory 120 of the data transfer control platform 102 may further have, store and/or include a machine learning engine 134 that generates the machine learning dataset 132, e.g., based on the current condition dataset 128 and/or the historical condition dataset 130. The machine learning engine 134 and the machine learning datasets 132 may store instructions and/or data that cause or enable the data transfer control platform to determine or predict one or more data transfer conditions. The machine learning dataset 132 may thus be based on historical data transfer conditions related to the data source(s), the data destination(s), the network(s) used to transfer the data, the transferred data itself, and the like.

The machine learning engine 134 may employ one or more machine learning algorithms to generate the machine learning datasets 132. Examples of machine learning algorithms that may be employed include supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be selectively employed. In some examples, the machine learning engine 134 may analyze the current condition dataset 128 and/or the historical condition dataset 130 to identify patterns of activity, sequences of activity, and the like, to generate one the machine learning datasets 132. Additionally or alternatively, the machine learning engine 134 may analyze a frequency of activity by the data source(s), the data destination(s), and/or the network(s) used to transfer the data. For instance, the machine learning engine 134 may analyze the historical condition dataset 130 to determine whether a frequency of a particular activity by a data source, a data destination, or a network occurred a threshold number of times within a predetermined time period, to determine a likelihood that a particular event will occur or a particular status will be observed at a specified time or within a specified timeframe. This information may be used to generate the machine learning datasets 132.

The machine learning dataset 132 may include machine learning data linking one or more actions by a data source, data destination, or network (e.g., data transfer initiated, data transfer requested, data store cleared, CPU usage dropped, network latency reduced, or the like) with a time and/or day or date of the action to identify one or more patterns or sequences of actions that may aid in predicting one or more likely data transfer conditions. For instance, the machine learning dataset 132 may include data linking a data source's data transfers to a particular timeframe (e.g., a particular time, on a particular day of the week, on a particular day of the month, or the like), data linking a data destination's utilization of its computing resources to a particular timeframe (e.g., storage capacity, CPU usage, and the like), and data linking a network's status to a particular timeframe (e.g., latency, traffic, bandwidth, and the like). Thus, this data may enable the data transfer computing platform 102 to predict a likely future action of a data source, data destination, and/or network during that timeframe, and generate data transfer instructions based on those predictions in order to more efficiently execute data transfers in the computing environment. In some examples, the machine learning dataset 132 may be generated by, for example, the machine learning engine 134. Additionally or alternatively, machine learning data may be generated by a computing device associated with a second platform different from the data transfer control platform 102 and/or a second entity different from the entity implementing the data transfer control platform. This machine learning data may be transmitted from the second entity to the data transfer control platform 102 and stored in its memory 120 as part of the machine learning dataset 132.

Accordingly, machine learning may be employed to predict a likelihood of an issue occurring or impacting one or more systems, devices, events, networks, and the like, and data transfer instructions may thus be based on the predicted likelihood. For example, historical data related to one or more system, device, event, and/or network issues that previously occurred (and, in some examples, has been resolved), conditions associated with a particular system, device, event, and/or network when an issue occurred, external factors such as date, time, day of week, day of month, month end, quarter end, year end, or the like, when one or more issues occurred, and/or activities that occurred at or near the time of issues that previously occurred—for example, file transfers of files having large file sizes (e.g., file size above a predetermined file size threshold), scheduled maintenance or updates, or the like—may be used to generate one or more machine learning datasets. The machine learning datasets may then be compared to current conditions of one or more systems, devices, events, networks and the like received via a real-time time content data stream to predict a likelihood of an issue occurring or impacting one or more systems, devices, events, networks, and the like.

Figure 3:
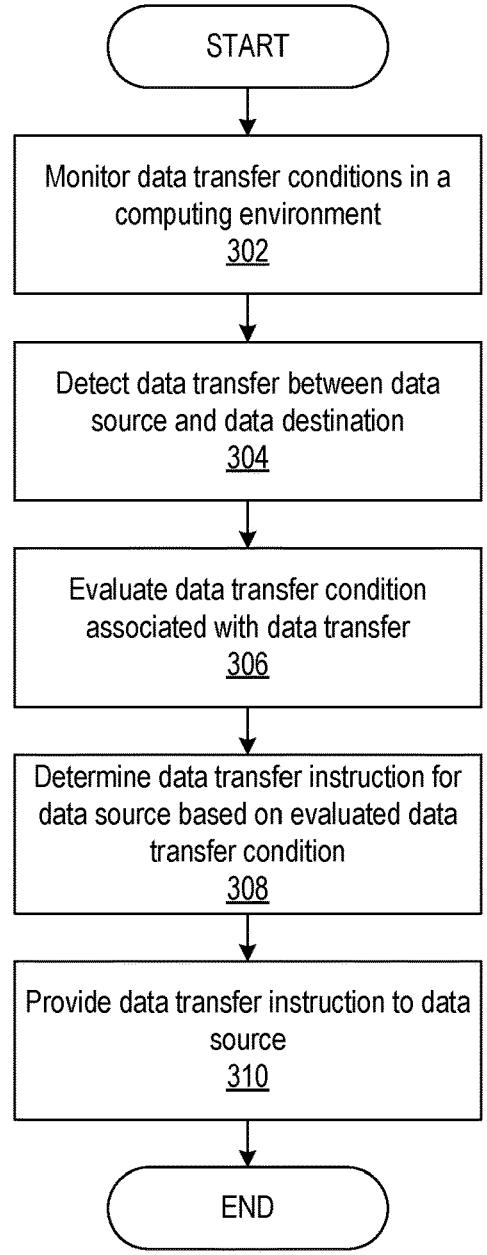
FIG. 3 depicts an illustrative flowchart of example method steps for controlling data transfers in accordance with aspects described herein.

Referring now to FIG. 3, a flowchart 300 of example method steps for controlling a data transfer using the data transfer control platform 102 is shown.

As described above, the data transfer control platform 102 monitors the data transfer conditions in a computing environment (302). The data transfer control platform 102 may monitor the data transfer conditions regardless of whether there is a current or upcoming data transfer. In this way, the data transfer control platform 102 may compile information pertaining to current and historical data transfer conditions for use when determining a data transfer instruction to provide to a data source and for analysis using machine-learning techniques, e.g., to identify patterns, correlations, and the like pertaining to data transfer conditions in the computing environments.

As also described above, the data transfer control platform 102 detects a data transfer between a data source 106 or 112 and a data destination 108 or 114 (304). The detected data transfer may be a current data transfer that is actively occurring or an upcoming data transfer that is planned or scheduled to occur. The data transfer control platform 102 may detect current and upcoming data transfers in various ways. For example, the data transfer control platform 102 may poll one or more data sources 106 or 112 at regular or irregular intervals to determine if the data sources are currently executing a data transfer or have any upcoming data transfers scheduled (e.g., at a specific date and/or time) or planned (e.g., in the future but without a specified date and/or time). As another example, a data source 106 or 112 may notify or otherwise inform the data transfer control platform of any upcoming data transfers that are scheduled or planned (e.g., by providing a schedule of upcoming data transfers, a message of an impending data transfer that is about to begin, and the like). As a further example, the data transfer control platform 102 may also predict, based on the machine learning dataset, that a data transfer is about to occur, occur within a particular timeframe (e.g., within x minutes, hours, and the like), occur within a particular time period (e.g., between 9:00 AM and 9:15 AM), and the like. Such predictions may be made globally with respect to the computing environment, collectively with respect to a group of data sources 106 or 112, and/or individually with respect to a single data source.

Having detected a data transfer, the data transfer control platform 102 evaluates a data transfer condition associated with the data transfer (306). As mentioned above, evaluating a data transfer condition associated with a detected data transfer includes identifying a condition, characteristic, status, and the like pertaining to the computing environment, the data source, the data destination, the network, and/or the data itself that is (or will be) contemporaneous with the detected data transfer which might affect its execution. One example involves determining that the size of the data to be transferred exceeds the available storage capacity at the data destination. In this example, the data transfer conditions evaluated by the data transfer control platform include the size of the data and the storage capacity at the data destination. Additional and alternative examples will be appreciated with the benefit of this disclosure.

Having evaluated the data transfer condition(s), the data transfer control platform 102 determines a data transfer instruction for the data source based on the evaluated data transfer condition(s) (308). As also mentioned above, the data transfer instruction may indicate when, where, and/or how to transfer the data. Continuing the example above in which the available storage capacity at the data destination is not sufficient for the size of the data to be transferred, the data transfer control platform 102 may determine various data transfer instructions to provide to the data source. One instruction, for example, might indicate an alternative data destination the data source should transfer the data to in which the alternative data destination has sufficient storage capacity to store the data. It will be appreciated that, in this example, the available storage capacity at the alternative data destination is another data transfer condition evaluated by the data transfer control platform 102. Another instruction might indicate a specified date and time at which the data source should transfer the data to the data destination based on a determination (or prediction) by the data transfer control platform 102 that the data destination will have sufficient storage capacity to store the data at the specified date and time (e.g., due to historical patterns of storage capacity observed by the data transfer control platform). Further still, another data transfer instruction may indicate the data source should parcel the data into multiple data parcels (e.g., data parcels of size x and/or a total of y data parcels) in which the size and/or number of data parcels is determined based on the available storage capacity at the data destination. It will be appreciated that the data transfer control platform 102 may provide multiple data transfer instructions to a data source indicating the manner in which the data source should execute the data transfer (e.g., transfer the data to an alternative data destination at a specified date and time in y total data parcels each of size x). Having determined the data transfer instruction(s) for the data transfer, the data transfer control platform 102 provides the data transfer instruction(s) to the data destination (310) which then executes the data transfer in accordance with the data transfer instruction(s) received.

Figure 6:
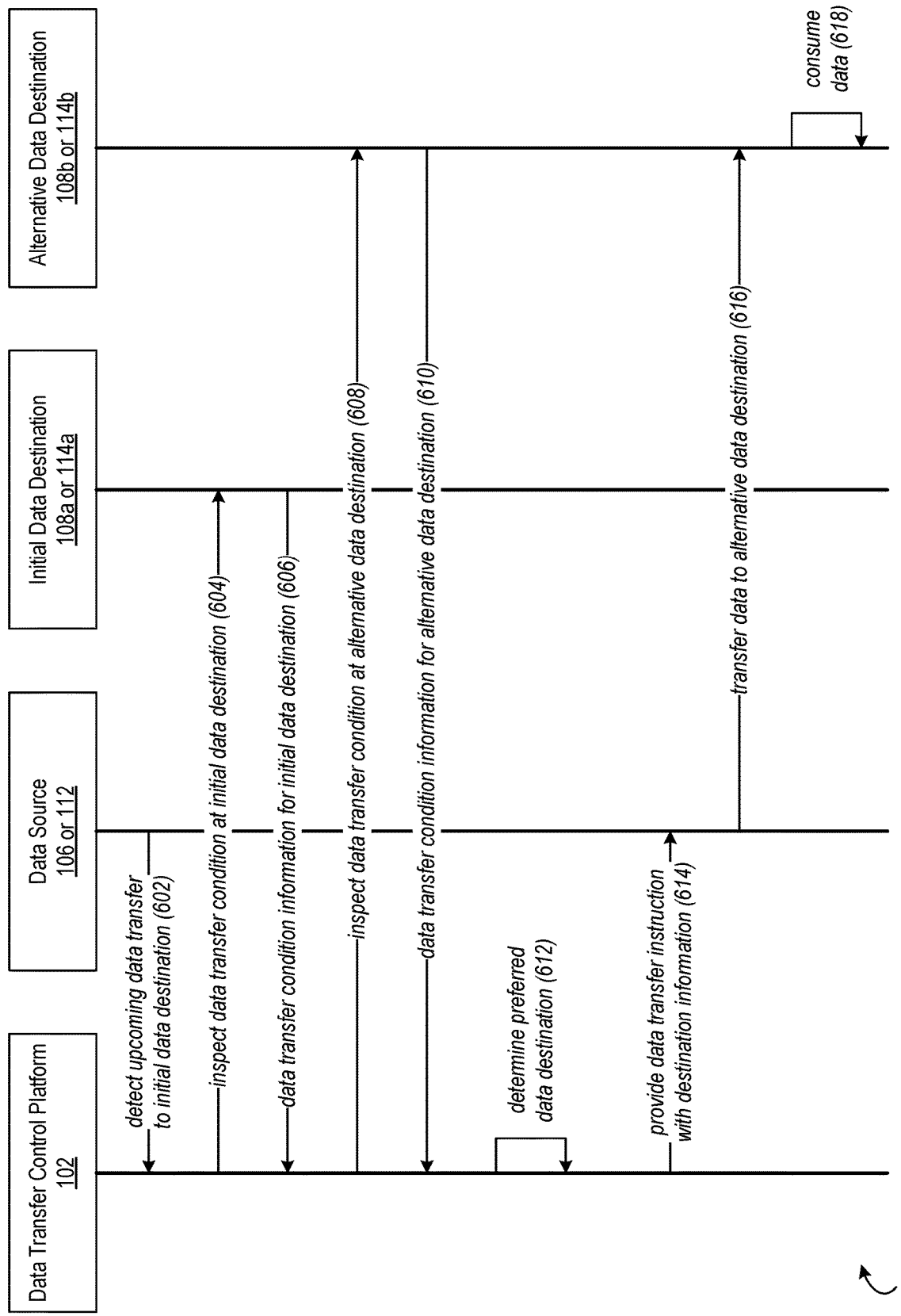
FIG. 6 depicts an illustrative event sequence for rerouting an example data transfer to an alternative destination in accordance with aspects described herein.
Figure 7:
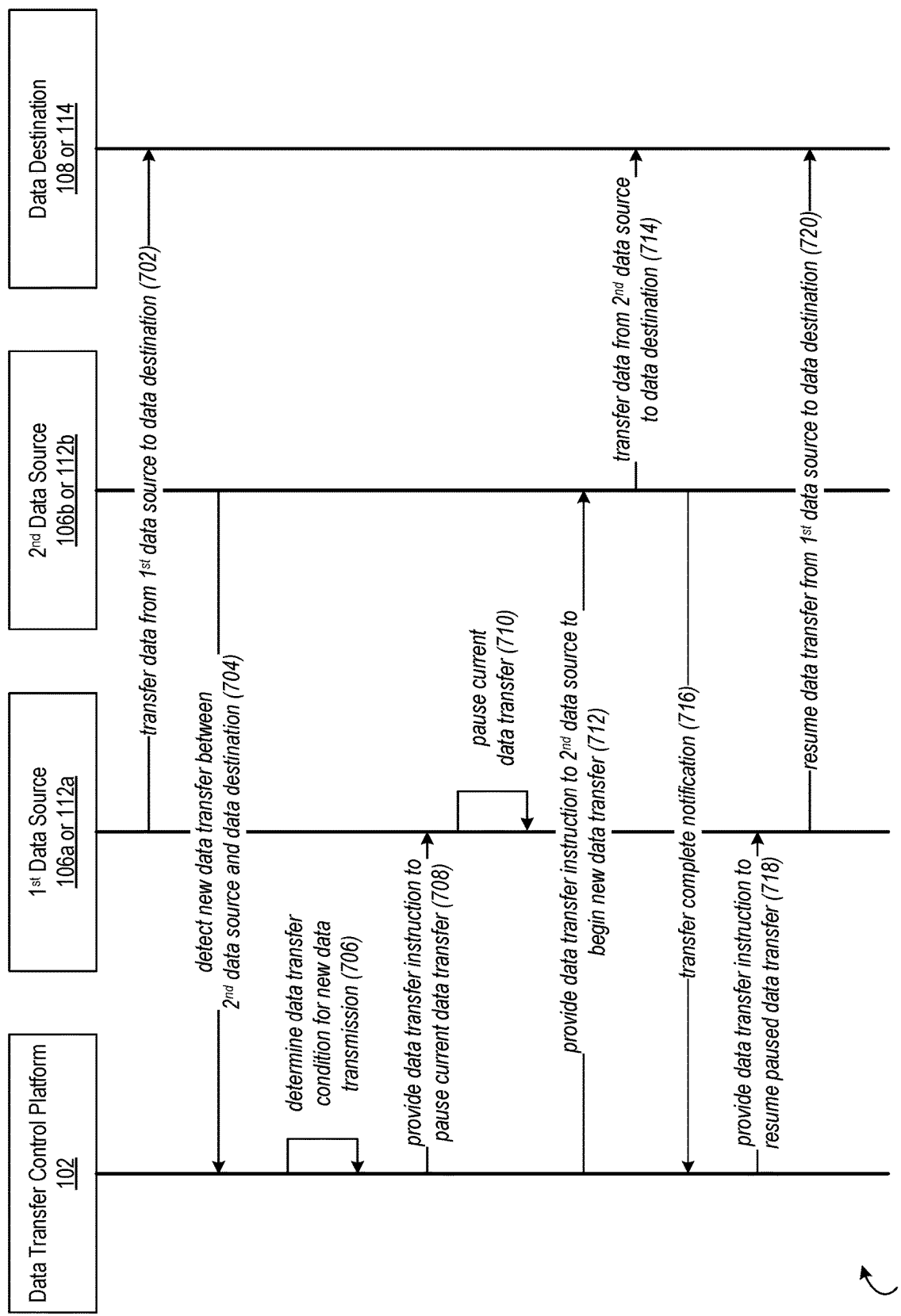
FIG. 7 depicts an illustrative event sequence for controlling multiple data transfers in accordance with aspects described herein.
Figure 8:
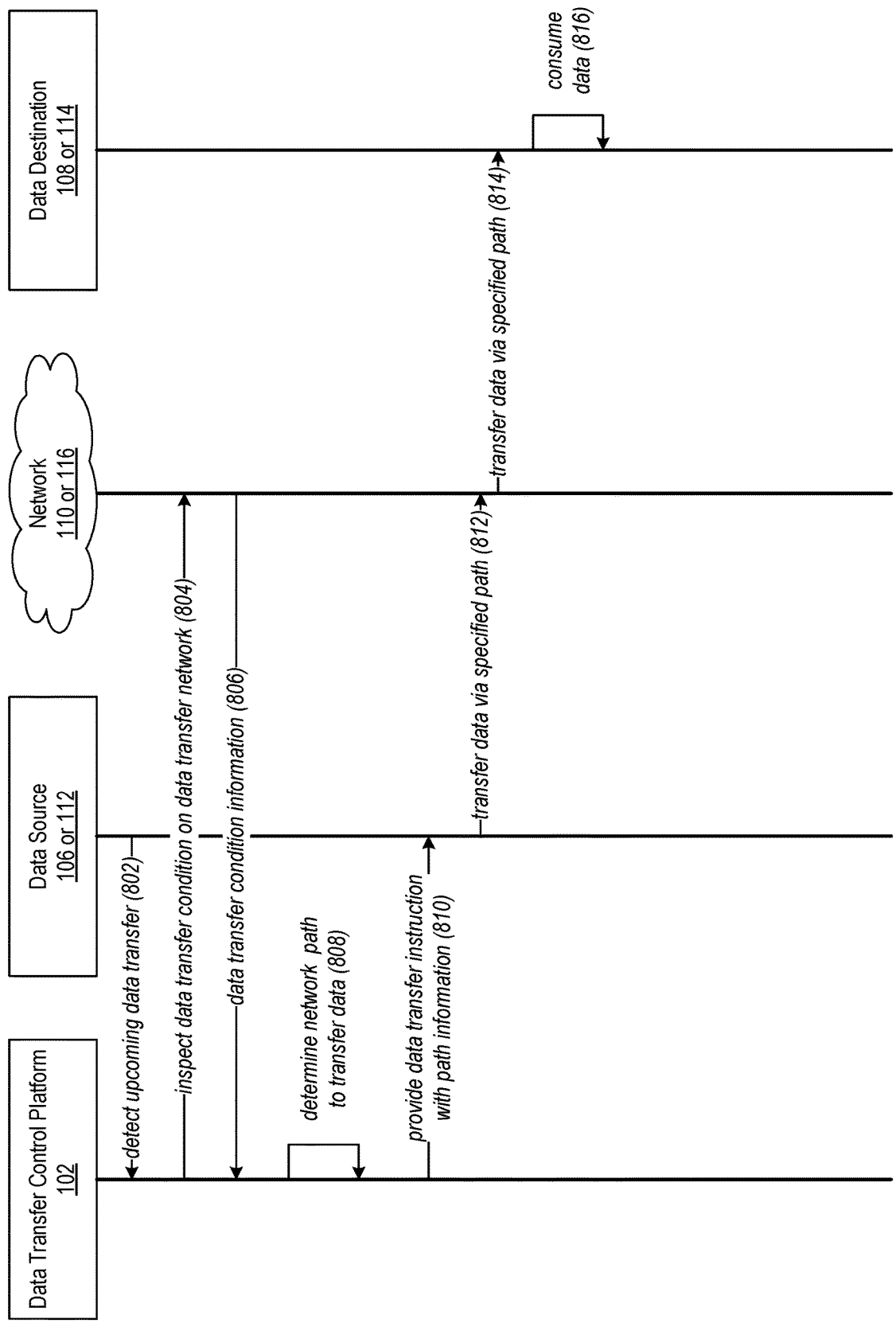
FIG. 8 depicts an illustrative event sequence for routing an example data transfer along a network path in accordance with aspects described herein.

Referring now to FIGS. 4-8, example sequence diagrams are shown for exercising various types of control over data transfers including scheduling a data transfer (FIG. 4), parceling the data to be transferred (FIG. 5), routing the data to an alternative data destination (FIG. 6), pausing/resuming a current data transfer in favor of a new data transfer (FIG. 7), and routing a data transfer along a specified network path (FIG. 8). These sequences are provided simply by way of example to illustrate the various principles associated with controlling data transfers in a computing environment described herein. Additional and alternative examples will be appreciated with the benefit of this disclosure.

Figure 4:
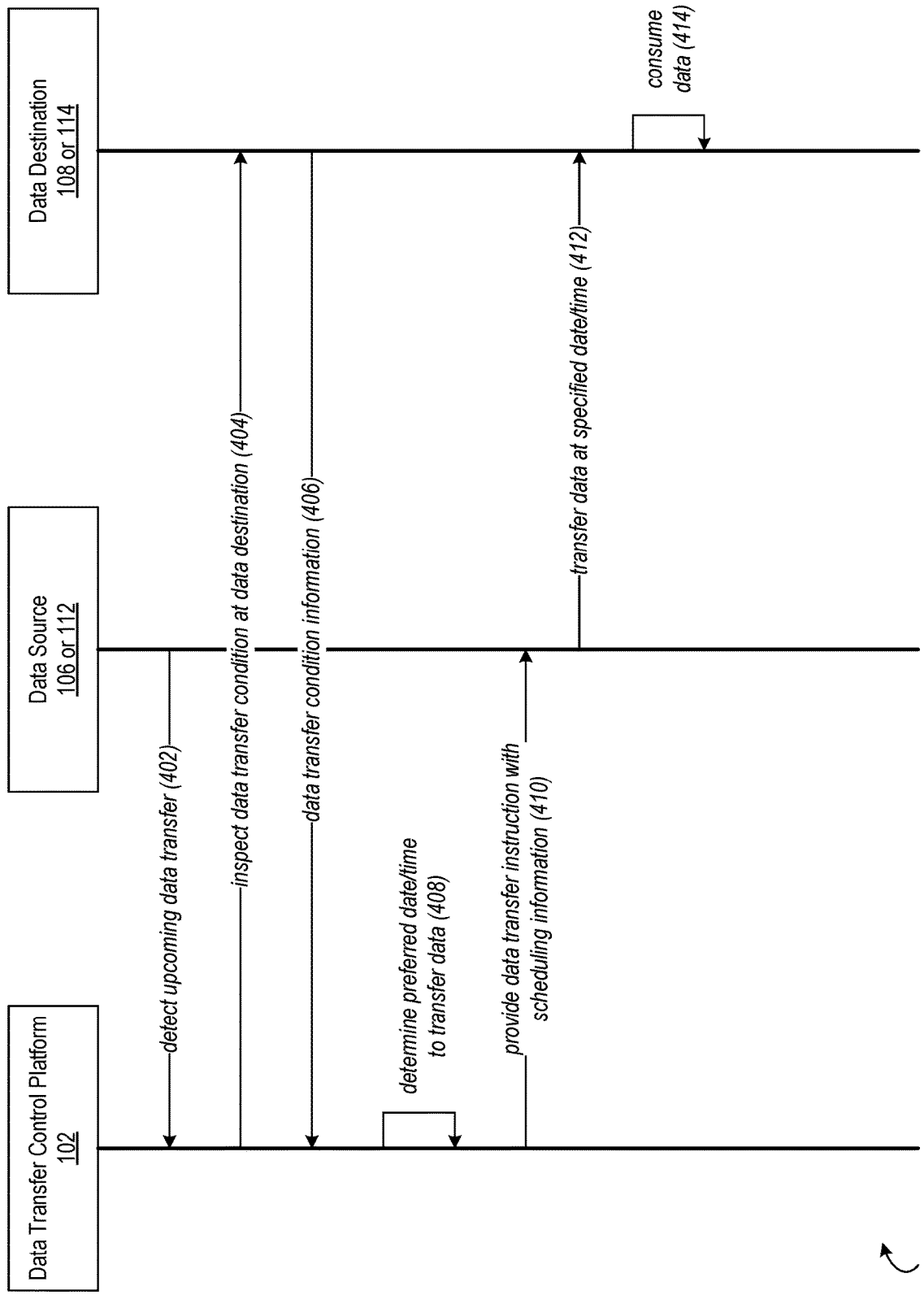
FIG. 4 depicts an illustrative event sequence for scheduling an example data transfer in accordance with aspects described herein.

Referring now to FIG. 4, an illustrative event sequence 400 for scheduling an example data transfer is shown. The data transfer control platform 102 may detect an upcoming data transfer by a data source 106 or 112 (402). The data transfer control platform 102 may then inspect (or predict) a data transfer condition at the data destination 108 or 114 (404). The data transfer control platform 102 may then receive data transfer condition information from the data destination 108 or 114 (406). Although FIG. 4 depicts the data transfer control platform 102 receiving the data condition information from the data destination 108 or 114 itself, the data transfer control platform may receive the data transfer condition information from another component of the computing environment, the machine learning dataset, and the like. And although FIG. 4 depicts the data condition information as being associated with the data destination 108 or 114, the data transfer control platform 102 may obtain data transfer condition information about additional or alternative components of the computing environment in order to determine what data transfer instruction to provide to the data source 106 or 112. The data transfer control platform 102 may evaluate the data transfer condition information received in order to determine a preferred date and/or time to transfer the data (408). The data transfer control platform 102 may then provide to the data source 106 or 112 a data transfer instruction indicating the selected date and/or time at which the data source should transfer the data to the data destination 108 or 114 (410). Having received the data transfer instruction, the data source 106 or 112 may then execute the data transfer at the date and/or time specified in the data transfer instruction (412). The data destination 108 or 114 may receive and consume (e.g., store, process, display, and the like) the transferred data (414).

A data transfer control platform may schedule data transfers in a variety of scenarios. For example, a data transfer may be scheduled to allow for the utilization of computing resources at the data destination to improve, e.g., to allow for the storage capacity to increase, to allow for CPU usage to decrease, and the like. A data transfer may also be scheduled to allow for network latency, network bandwidth, and/or network traffic to improve. A new data transfer may be scheduled to allow a currently executing data transfer to complete before initiating the new data transfer. A data transfer may be scheduled to order the execution of multiple data transfers based on various criteria such as importance (e.g., by priority, by a required deadline), anticipated time to complete (e.g., ordered by increasing or decreasing estimated completion times), and other criteria that may be considered to provide for an intelligent scheduling of data transfers. Data transfers may also be scheduled to satisfy service level agreements within the computing environment which specify various requirements with respect to transferring data between data sources and data destinations including, for example, timeframes within which data transfers must be completed. Data sources may provide their respective service level agreements to the data transfer control platform for use when determining when to schedule a data transfer.

A data transfer be scheduled based on the processing throughput of the data destination. For example, if the data destination can process x amount of data within y amount of time, then multiple stages of a data transfer may be scheduled such that data parcels (e.g., each having x amount of the data) are transferred to the data destination at intervals based on the processing throughput of the data destination (e.g., intervals of duration y) such that the data source transfers portions of the data in accordance with how fast the data destination can consume it. These data transfer control techniques are applicable to a variety of scenarios including data transfers for transaction processing, data transfers for text processing, data transfers for image processing, data transfers for sound processing, data transfers for video processing, and the like. The data to be transferred may include or otherwise be associated with transactions (e.g., financial transactions) to be processed by the data destination which can only process a limited number or amount of transactions at a time, in which case transfers of transaction data may be scheduled according to how fast the data destination can process a batch of transactions. For example, if the data destination can only process transactions totaling $x (e.g., a total of $1,000,000) in a given time period, then the transactions transferred may be selected and scheduled so as not to exceed this total for the relevant time period—e.g., in a batch of transactions each having different amounts, selecting two transactions each having an amount of $500,000 for one transfer and selecting four transactions each having an amount of $250,000 for another transfer). The data to be transferred may include or otherwise be associated with text to be processed by the data destination (e.g., optical character recognition, semantic analysis, text manipulation, text-to-speech, text encryption/decryption) which can only process a limited amount of text at a time, in which case transfers of text data may be scheduled according to how fast the data destination can process a certain amount of text. The data to be transferred may include or otherwise be associated with images to be processed by the data destination (e.g., image recognition, image rendering, image manipulation, image encryption/decryption) which can only process a limited amount of image data at a time, in which case data transfers may be scheduled according to how fast the data destination can process a certain amount of image data. The data to be transferred may include or otherwise be associated with audio to be processed by the data destination (e.g., automatic speech recognition, natural language understanding, audio compression, audio conversion, audio manipulation, audio encryption/decryption) which can only process a limited amount of audio at a time, in which case data transfers may be scheduled according to how fast the data destination can process a certain amount of audio data. The data to be transferred may include or otherwise be associated with video to be processed by the data destination (e.g., video recognition, video rendering, video compression, video conversion, video manipulation, video encryption/decryption) which can only process a limited amount of video at a time, in which case data transfers may be scheduled according to how fast the data destination can process a certain amount of video data.

Figure 5:
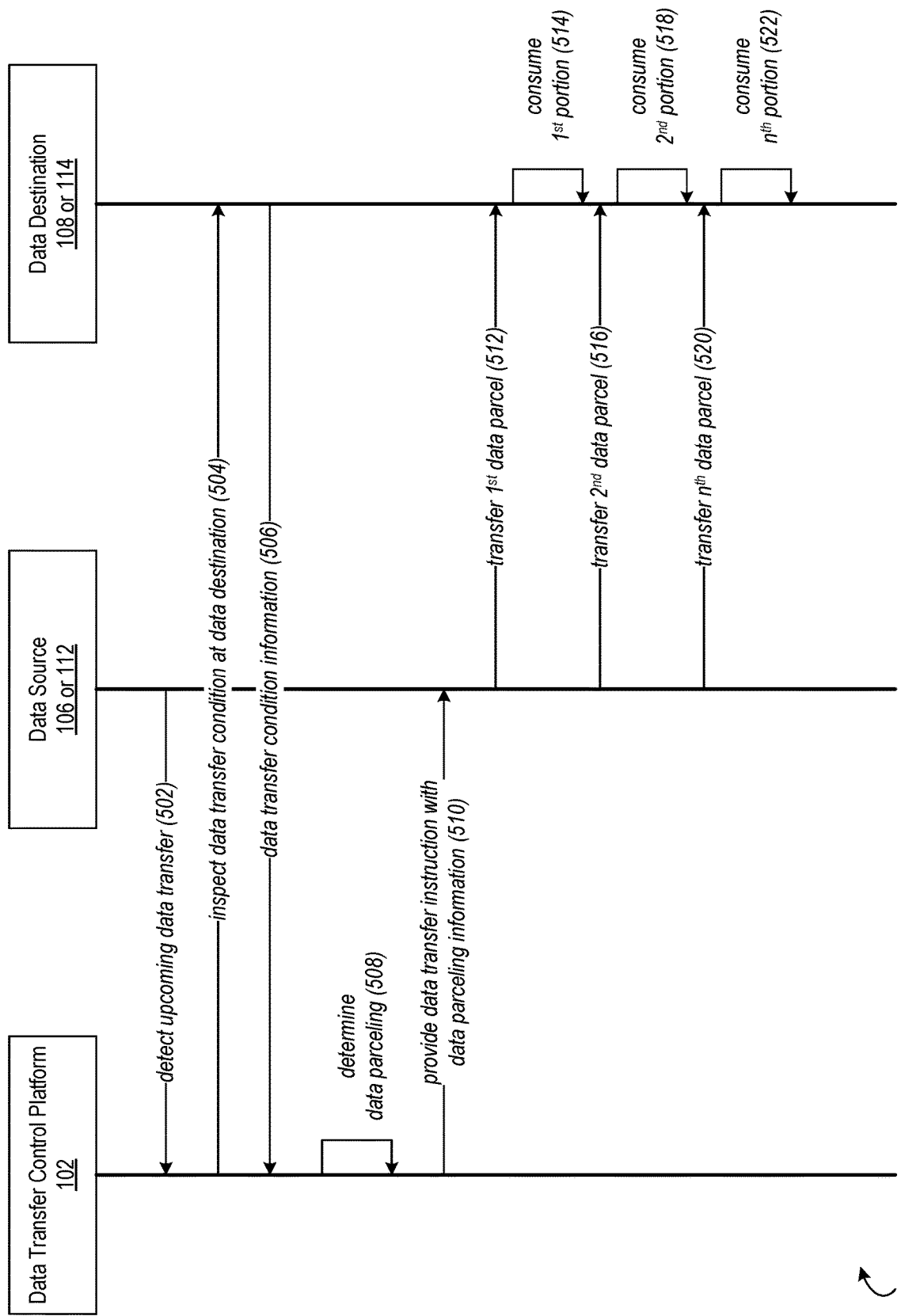
FIG. 5 depicts an illustrative event sequence for parceling an example data transfer in accordance with aspects described herein.

Referring now to FIG. 5, an illustrative event sequence 500 for parceling the data of an example data transfer is shown. The data transfer control platform 102 may detect an upcoming data transfer by a data source 106 or 112 (502). The data transfer control platform 102 may then inspect (or predict) a data transfer condition at the data destination 108 or 114 (504). The data transfer control platform 102 may then receive data transfer condition information from the data destination 108 or 114 (506). Again, although FIG. 5 depicts the data transfer control platform 102 receiving the data condition information from the data destination 108 or 114, the data transfer control platform may receive the data transfer condition information from or about additional and/or alternative components of the computing environment. The data transfer control platform 102 may evaluate the data transfer condition information received in order to determine how to parcel the data when transferring it (508). The data transfer control platform 102 may then provide to the data source 106 or 112 a data transfer instruction indicating the selected manner in which the data source should parcel the data (510). Having received the data transfer instruction, the data source 106 or 112 may transfer a first data parcel to the data destination 108 or 114 (512). As shown by way of example in FIG. 5, the data source 106 or 112 waits for the data destination 108 or 114 to consume the portion of the data received in the data parcel before transferring subsequent data parcels. Accordingly, the data destination 108 or 114 may consume the first portion of the data received in the first data parcel (514), and the data source may then transfer a second data parcel to the data destination (516). Again, the data destination 108 or 114 may consume the portion of the data received in the second data parcel (518), and the process may repeat until the data source 106 or 112 sends the nth data parcel to the data destination (520) which, in turn, consumes the data received in the $n^{th}$ data parcel (522).

Like scheduling data transfers, a data transfer control platform may parcel data for transfer in multiple stages in a variety of scenarios. Those scenarios include those discussed above with respect to: network latency, traffic, and/or bandwidth; the storage capacity, CPU usage, and/or other computing resource utilization at the data destination; the processing throughput at the data destination (e.g., transaction, text, image, audio, or video processing); service level agreements requiring best efforts be employed for data transfers (e.g., transferring whatever portion of the data possible), and additional and alternative scenarios which will be appreciated with the benefit of this disclosure.

In FIG. 6, an illustrative event sequence 600 for routing a data transfer to an alternative data destination is shown. The data transfer control platform 102 may detect an upcoming data transfer by a data source 106 or 112 (602). The data transfer control platform 102 may then inspect (or predict) a data transfer condition at the initial data destination 108a or 114a for the data transfer (604). The data transfer control platform 102 may then receive data transfer condition information from the initial data destination 108a or 114a (606). As noted above, the data transfer control platform 102 may receive the data transfer condition information from or about additional and/or alternative components of the computing environment. The data transfer control platform may then inspect (or predict) another data transfer condition at an alternative data destination 108b or 114b (608) and receive additional data transfer condition information from the alternative data destination (610). The additional data transfer condition information may likewise be obtained from or about additional and/or alternative components of the computing environment. The data transfer control platform 102 may then evaluate the data transfer condition information received in order to determine a preferred data destination for the data transfer (612). The data transfer control platform 102 may then provide a data transfer instruction to the data source 106 or 112 indicating an alternative data destination 108*b* or 114*b* to transfer the data to (614). Having received the data transfer instruction, the data source 106 or 112 may transfer the data to the alternative data destination 108*b* or 114*b* specified (616), and the alternative data destination may consume the data received (618).

A data transfer control platform may select an alternative data destination for a data transfer in a variety of scenarios. For example, a data transfer control platform may instruct a data source to transfer data to an alternative data destination having a better utilization of computing resources relative to the initial data destination (e.g., more storage capacity, less CPU usage). In another example, a data transfer control platform may instruct a data source to transfer data to an alternative data destination having better processing throughput relative to the initial data destination. As a further example, a data transfer control platform may instruct a data source to transfer data to an alternative data destination if it determines (or predicts) that the data transfer would be completed faster if the data source transferred the data to the alternative data destination rather than the initial data destination, e.g., due to better network conditions (e.g., latency, traffic, bandwidth) between the data source and the alternative data destination and those between the data source and the initial data destination. It should also be appreciated that data transfer instructions to route data to an alternative destination may be combined with data transfer instructions to parcel the data such that a first portion of the data is sent to the initial data destination in one or more data parcels and another portion of the data is sent to the alternative data destination in one or more data parcels (e.g., for parallel processing of the data by the initial and alternative data destinations).

In FIG. 7, an illustrative event sequence 700 for pausing and resuming a current data transfer in response to detecting a new data transfer is shown. A first data source 106*a* or 112*a* may initiate a data transfer to a data destination 108 or 114 (702). The data transfer control platform 102 may then detect a new data transfer between the data destination 108 or 114 and a second data source 106*b* or 112*b* (704) and determine a data transfer condition for the new data transmission (706). In this example, the data transfer condition is the existence of a currently executing data transfer between the first data source 106*a* or 112*a* and the data destination 108 or 114. In response to this data transfer condition, the data transfer control platform 102 may provide to the first data source 106*a* or 112*a* a data transfer instruction to pause the current data transfer (708), and the first data source may pause the current data transfer in response to receipt of the data transfer instruction (710). The data transfer control platform 102 may then provide a data transfer instruction to the second data source 106*b* or 112*b* to initiate the new data transfer to the data destination (712), and the second data source may initiate the new data transfer in response to receipt of the data transfer instruction (714). It should be appreciated that the second data source 106*b* or 112*b* may, in some scenarios, initiate the new data transfer without receiving an instruction from the data transfer control platform 102. Once the new data transfer is complete, the second data source 106*b* or 112*b* may provide a notification to the data transfer control platform 102 indicating the transfer is complete (716). It should also be appreciated that the data transfer control platform 102 may determine the new data transfer is complete without receiving a notification from the second data source 106*b* or 112*b* (e.g., by polling, querying, or otherwise inspecting the second data source). Upon determining that the new data transfer is complete, the data transfer control platform 102 may provide to the first data source 106*a* or 112*a* another data transfer control instruction to resume the paused data transfer (718), and the first data source may resume its data transfer to the data destination 108 or 114 (720).

A data transfer control platform may provide data transfer instructions to pause/resume current data transfer in additional and alternative scenarios. For example, a single data source may execute both the current and new data transfers, and/or different data destinations may respectively receive the data transferred for the current and new data transfers. In addition, a data transfer control platform may provide an instruction to pause a current data transfer for a variety of reasons including, for example, to favor the new data transfer based on its importance relative to the current data transfer, to improve the network conditions (e.g., the available bandwidth) on a network shared between data sources, and the like. Additional and alternative examples will be appreciated with the benefit of this disclosure.

Turning now to FIG. 8, an illustrative event sequence 800 for routing a data transfer along a particular network path is shown. The data transfer control platform 102 may detect an upcoming data transfer by a data source 106 or 112 (802). The data transfer control platform 102 may then inspect (or predict) a data transfer condition at a network 110 or 116 used to transfer the data (804). As discussed above, data transfer conditions associated with a network used to transfer the data include network latency, bandwidth, traffic, and the like. The data transfer control platform 102 may then receive data transfer condition information from the network 110 or 116 (806). Although FIG. 8 depicts the data transfer control platform 102 receiving the data condition information from the network 110 or 116, the data transfer control platform may receive the data transfer condition information about the network from additional and/or alternative components of the computing environment. The data transfer control platform 102 may evaluate the data transfer condition information received in order to determine a network path along which to transfer the data (808). The data transfer control platform 102 may then provide to the data source 106 or 112 a data transfer instruction indicating the selected network path along which the data source should transfer the data (810). Having received the data transfer instruction, the data source 106 or 112 may transfer the data to the data destination 108 or 114 along the specified network path (812), and the network 110 or 116 may deliver the transferred data to the data destination along that network path (814). The data destination 108 or 114 may receive and consume (e.g., store, process, display, and the like) the transferred data (816).

Figure 9:
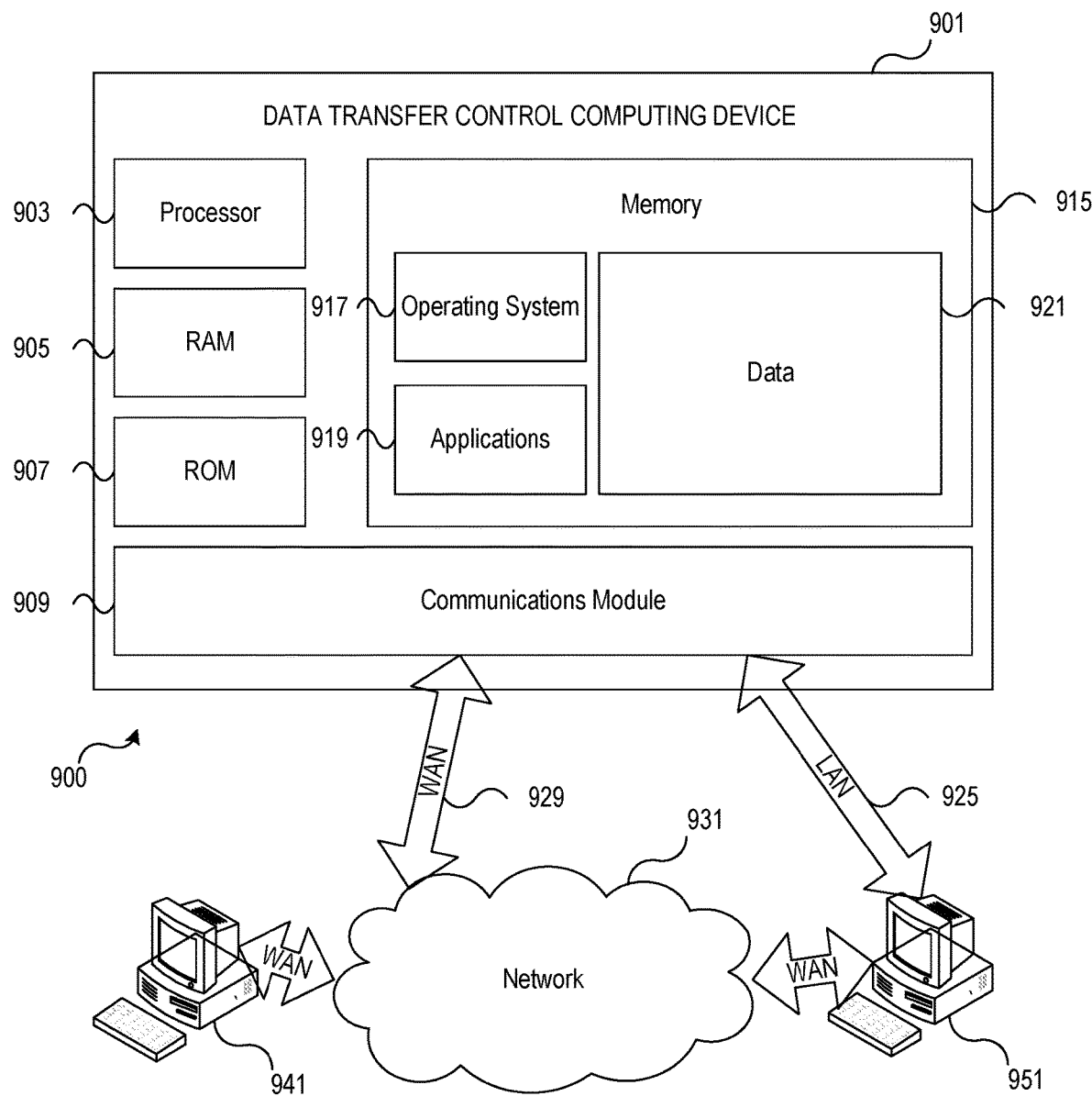
FIG. 9 depicts an example operating environment in which various aspects of the disclosure may be implemented in accordance with aspects described herein.

FIG. 9 depicts an illustrative operating environment in which various aspects of the present disclosure may be implemented in accordance with one or more example embodiments. Referring to FIG. 9, computing system environment 900 may be used according to one or more illustrative embodiments. Computing system environment 900 is only one example of a suitable computing environment and is not intended to suggest any limitation as to the scope of use or functionality contained in the disclosure. Computing system environment 900 should not be interpreted as having any dependency or requirement relating to any one or combination of components shown in illustrative computing system environment 900.

Computing system environment 900 may include data transfer control computing device 901 having processor 903 for controlling overall operation of data transfer control computing device 901 and its associated components, including Random-Access Memory (RAM) 905, Read-Only Memory (ROM) 907, communications module 909, and memory 915. Data transfer control computing device 901 may include a variety of computer readable media. Computer readable media may be any available media that may be accessed by data transfer control computing device 901, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 901.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on data transfer control computing device 901. Such a processor may execute computer-executable instructions stored on a computer-readable medium.

Software may be stored within memory 915 and/or storage to provide instructions to processor 903 for enabling data transfer control computing device 901 to perform various functions. For example, memory 915 may store software used by data transfer control computing device 901, such as operating system 917, application programs 919, and associated database 921. Also, some or all of the computer executable instructions for data transfer control computing device 901 may be embodied in hardware or firmware. Although not shown, RAM 905 may include one or more applications representing the application data stored in RAM 905 while data transfer control computing device 901 is on and corresponding software applications (e.g., software tasks) are running on data transfer control computing device 901.

Communications module 909 may include a microphone, keypad, touch screen, and/or stylus through which a user of data transfer control computing device 901 may provide input, and may also include one or more of a speaker for providing audio output and a video display device for providing textual, audiovisual and/or graphical output. Computing system environment 900 may also include optical scanners (not shown). Exemplary usages include scanning and converting paper documents, e.g., correspondence, receipts, and the like, to digital files.

Data transfer control computing device 901 may operate in a networked environment supporting connections to one or more remote computing devices, such as computing devices 941 and 951. Computing devices 941 and 951 may be personal computing devices or servers that include any or all of the elements described above relative to data transfer control computing device 901.

The network connections depicted in FIG. 9 may include Local Area Network (LAN) 925 and Wide Area Network (WAN) 929, as well as other networks. When used in a LAN networking environment, data transfer control computing device 901 may be connected to LAN 925 through a network interface or adapter in communications module 909. When used in a WAN networking environment, data transfer control computing device 901 may include a modem in communications module 909 or other means for establishing communications over WAN 929, such as network 931 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 10:
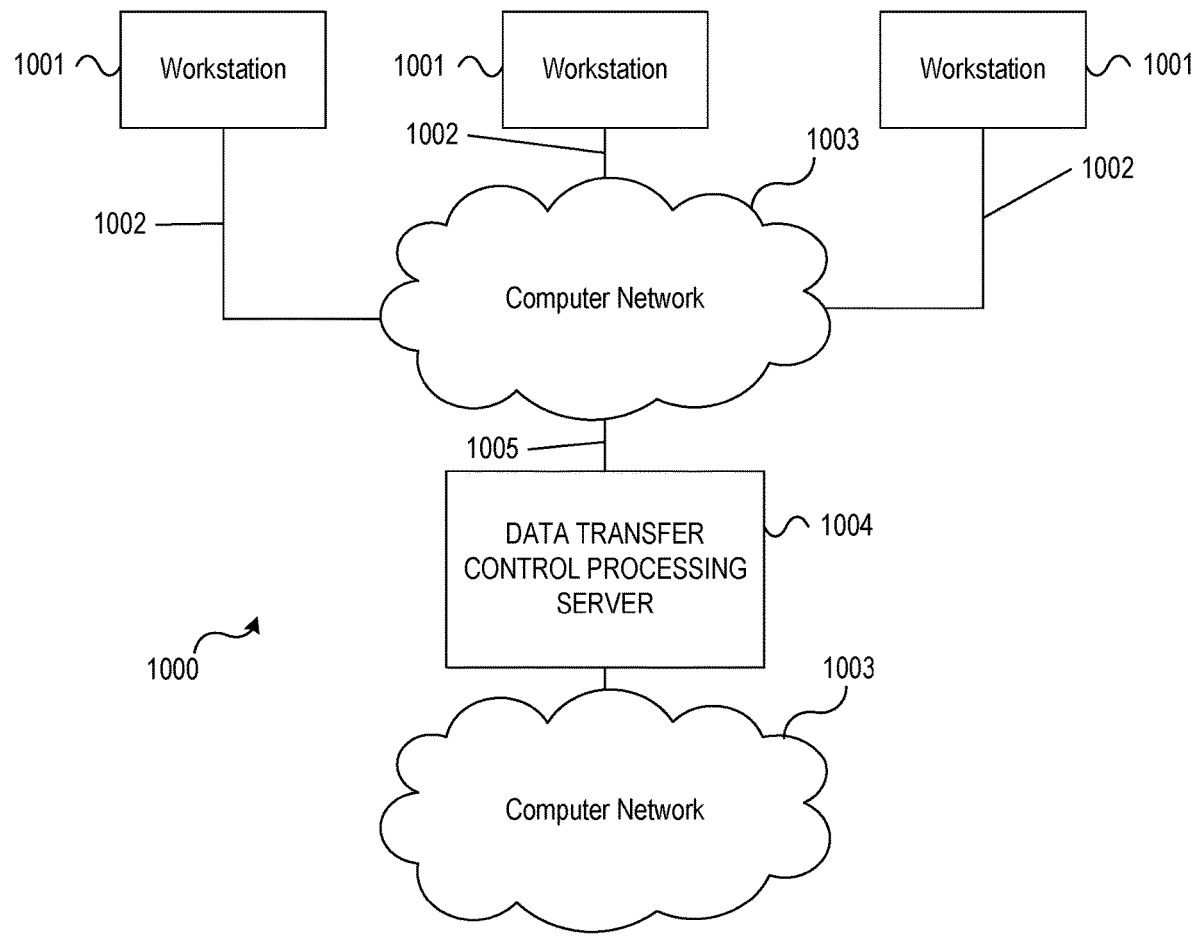
FIG. 10 depicts a block diagram of example of workstations and servers that may be used to implement the processes and functions of certain aspects of the present disclosure in accordance with aspects described herein.

FIG. 10 depicts an illustrative block diagram of workstations and servers that may be used to implement the processes and functions of certain aspects of the present disclosure in accordance with one or more example embodiments. Referring to FIG. 10, illustrative system 1000 may be used for implementing example embodiments according to the present disclosure. As illustrated, system 1000 may include one or more workstation computers 1001. Workstation 1001 may be, for example, a desktop computer, a smartphone, a wireless device, a tablet computer, a laptop computer, and the like, configured to perform various processes described herein. Workstations 1001 may be local or remote, and may be connected by one of communications links 1002 to computer network 1003 that is linked via communications link 1005 to data transfer control processing server 1004. In system 1000, data transfer control processing server 1004 may be any suitable server, processor, computer, or data processing device, or combination of the same, configured to perform the functions and/or processes described herein. Server 1004 may be used to inspect and evaluate the data transfer conditions, determine and provide the data transfer instructions, and the like.

Computer network 1003 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 1002 and 1005 may be any communications links suitable for communicating between workstations 1001 and data transfer control processing server 1004, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Figure 11:
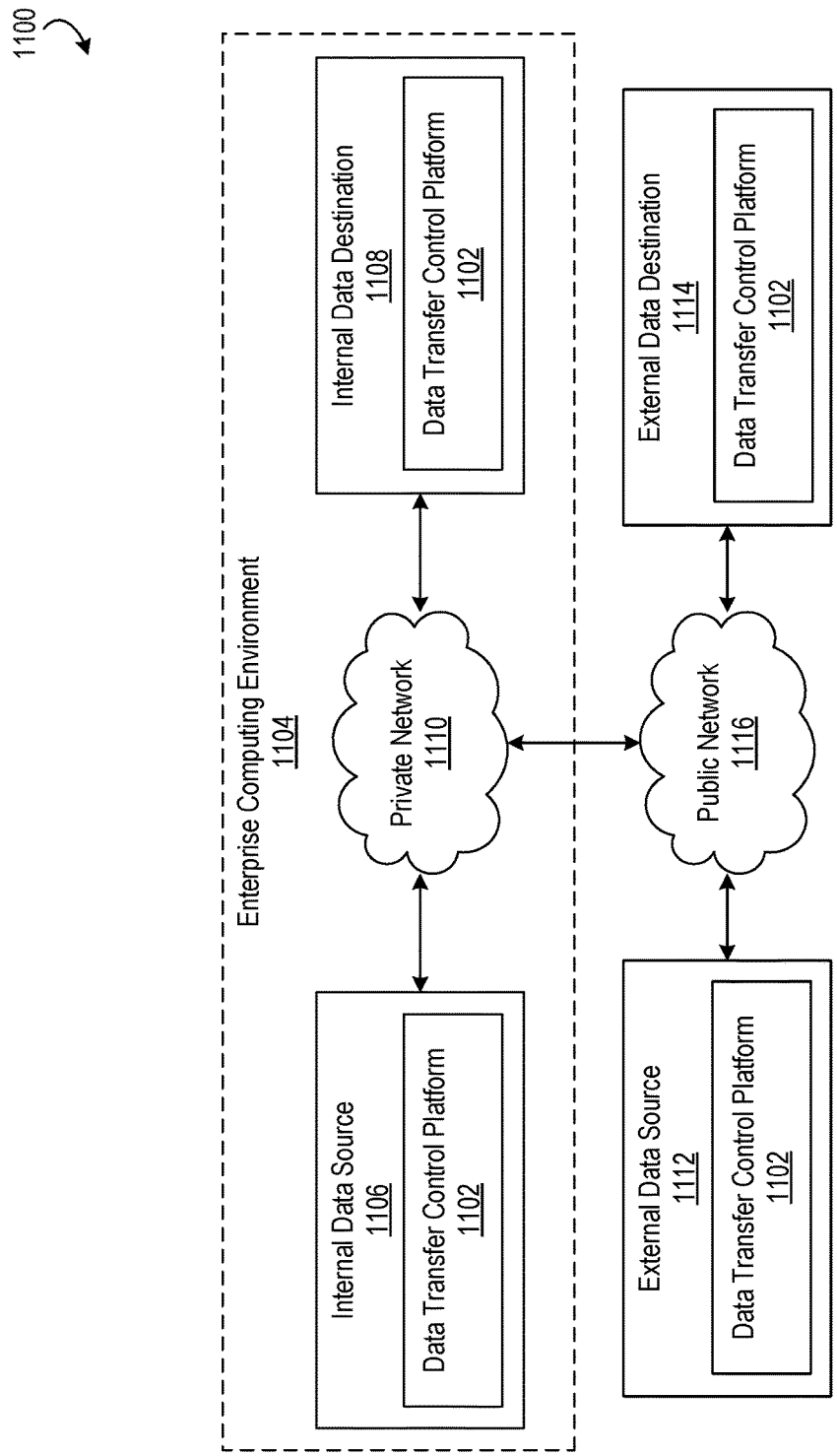
FIG. 11 depicts an alternative implementation of a data transfer control platform in accordance with aspects described herein.
Figure 12:
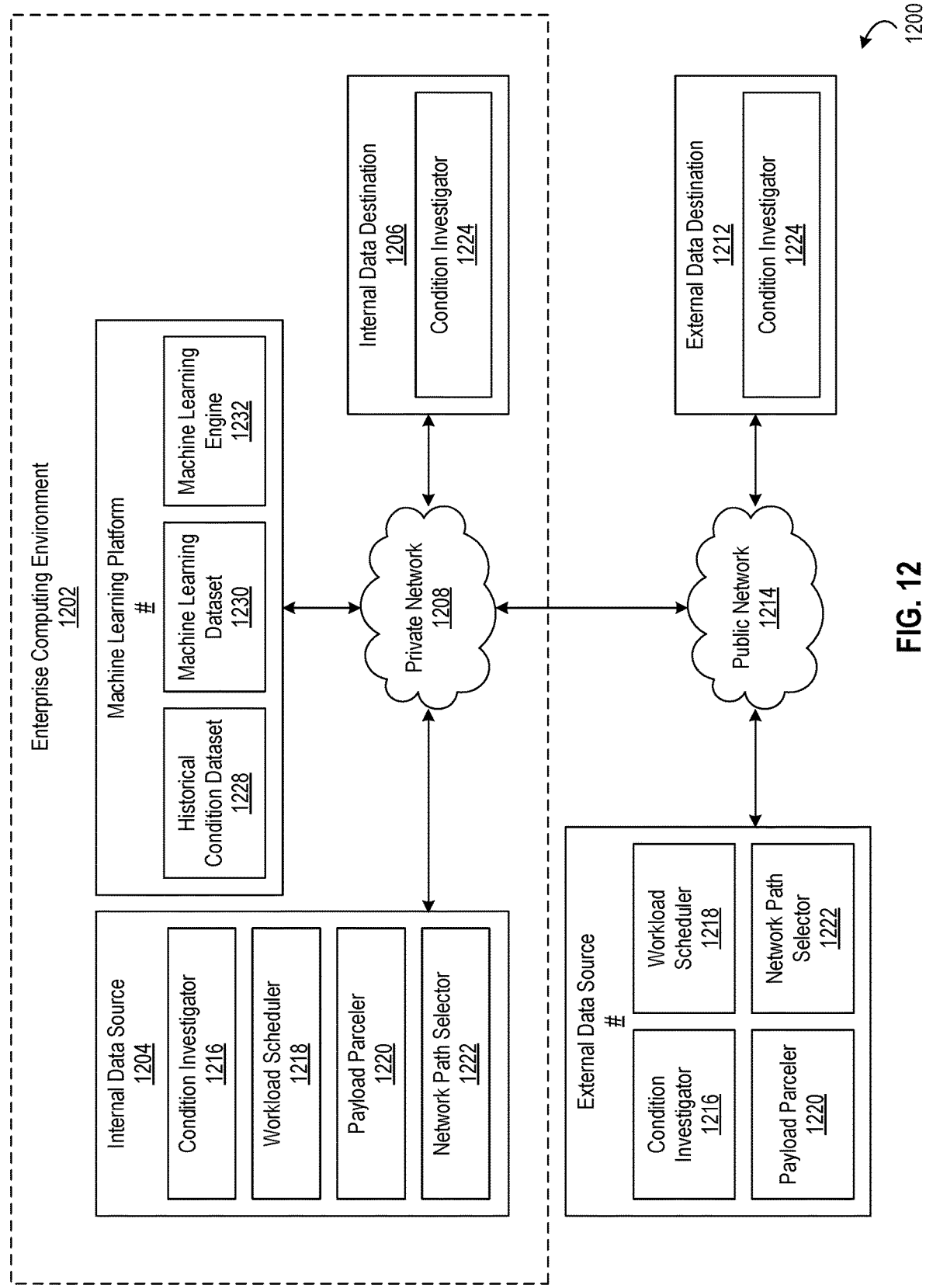
FIG. 12 depicts another alternative implementation of a data transfer control platform in accordance with aspects described herein.

Referring now to FIG. 11 and FIG. 12, alternative implementations of the data transfer control platform are shown. The data transfer control platform 102 discussed above with reference to FIG. 1 is, in that example, a centralized data transfer control platform that resides remotely relative to the data sources 106 and 112 and the data destinations 108 and 114. Alternative implementations as possible, however, including implementations in which a data transfer control platform is implemented locally at each of one or more data sources and/or data destinations and including implementations in which aspects of a data transfer control platform are distributed across one or more data sources and/or data destinations in the computing environment.

In FIG. 11, an example of a computing environment 1100 having locally implemented data transfer control platforms 1102 is shown. The computing environment 1100, in this example, may similarly include an enterprise computing environment 1104 having an internal data source 1106 and an internal data destination 1108 in signal communication with each other via a private network 1110. The enterprise computing environment 1104 is likewise in signal communication with an external data source 1112 and an external data destination 1114 via a public network 1116. The private network 1110 and the public network 1116 may be the same as or at least similar to the private network 110 and the public network 116, respectively, discussed above with reference to FIG. 1. The data sources 1106 and 1112 and the data destinations 1108 and 1114 may be similar to the data sources 106 and 112 and the data destinations 108 and 114, respectively, also discussed above with reference to FIG. 1. In contrast to those data sources, however, the data sources 1106 and 1112 and the data destinations 1108 and 1114 of FIG. 11 each include a local data transfer control platform 1102. Each local data transfer control platform may be at least similar to the data transfer control platform 102 discussed above with reference to FIGS. 1-2. In this regard, each local data transfer control platform 1102 may be configured to detect data transfers at the data source or data destination at which it resides and generate data transfer control instructions for those data transfers. For example, a local data transfer control platform residing at a data destination 1108 or 1114 may detect an upcoming data transfer from a data source 1106 or 1112 and provide a data transfer instruction to the data source to wait until a specified time (or wait for a specified duration), e.g., in order to allow the data destination to free up a computing resource needed for the data transfer (e.g., storage space, CPU usage, and the like). In this regard, the local data transfer control platforms 1102 may communicate and coordinate among each other to control the data transfers in the computing environment 1100, e.g., using a request-response mechanism.

In FIG. 12, an example of a computing environment 1200 in which aspects of a data transfer control platform are distributed throughout the computing environment is shown. Similar to FIG. 1 and FIG. 11, an enterprise computing environment 1202 includes an internal data source 1204 and an external data source 1206 in signal communication with each other via a private network 1208. The enterprise computing environment 102, in this example, is likewise in signal communication with an external data source 1210 and an external data destination 1212 via a public network 1214. The private network 1208 and the public network 1214 may be the same as or at least similar to the private network 110 and the public network 116, respectively, discussed above with reference to FIG. 1. The data sources 1204 and 1210 and the data destinations 1206 and 1212 may be similar to the data sources 106 and 112 and the data destinations 108 and 114, respectively, also discussed above with reference to FIG. 1. In contrast to those data sources, however, the data sources 1204 and 1210 and the data destinations 1206 and 1212 of FIG. 12 each include aspects of a data transfer control platform. For example, the data sources 1204 and 1210, in this example, each include an individual condition investigator 1216, an individual workload scheduler 1218, an individual payload parceler 1220, and an individual network path selector 1222, which may be similar to the condition investigator 122, workload scheduler 124, payload parceler 126, and network path selector 128, respectively, discussed above with reference to FIG. 2. The data destinations 1206 and 1212, in this example, each include an individual condition investigator 1224, which may also be similar the condition investigator 122 discussed above with reference to FIG. 2. In some implementations, the condition investigators 1224 residing at the data destinations 1206 and 1212 may be configured to only monitor and report the data transfer conditions associated with the data destination, while the condition investigators 1216 residing at the data sources 1204 and 1210 may be configured to monitor the data transfer conditions at various locations in the computing environment 1200, e.g., other data sources, the data destinations, the networks, and the like. In this regard, the data sources 1204 and 1210 and the data destinations 1206 and 1212 may similarly communicate and coordinate among each other to obtain the condition information used to control the data transfers in the computing environment 1200, e.g., using a request-response mechanism. In addition, the enterprise computing environment 1202, in this example, includes an individual, centralized machine learning platform 1226 that includes an historical condition dataset 1228, a machine learning dataset 1230, and a machine learning engine 1232, which may be the same as or at least similar to the historical condition dataset 130, the machine learning dataset 132, and the machine learning engine 134, respectively, discussed above with reference to FIG. 2. In this regard, the condition investigators 1216 and 1224 may be configured to feed, report, or otherwise provide information to the machine learning platform 1226 about the data transfer conditions they monitor for storage as the historical condition dataset 1228. The machine learning platform may subsequently analyze the data transfer condition information in the historical condition dataset 1128 using the machine learning engine 1232 in order to generate the machine learning dataset 1230. The machine learning platform 1236 may then provide portions of the historical condition dataset 1228 and/or the machine learning dataset 1230 to the data sources 1204 and 1210 for use when generating the data transfer instructions.

Computing environments having various combinations of centralized, local, and distributed data transfer control platforms are also possible. For example, a computing environment may include a centralized data transfer control platform while one or more individual data sources and/or data destinations include a local data transfer control platform. In another example, a computing environment may include a centralized data transfer control platform while one or more aspects of a data transfer control platform (e.g., a condition investigator, workload scheduler, payload parceler, and/or network path selector) are distributed across individual data sources and/or data destinations of the computing environment. In a further example, some data sources and/or data destinations may include a local data transfer control platform while other data sources and/or data destinations may only include one or more aspects of a data transfer control platform (e.g., only a condition evaluator).

In some implementations, the system may be able to transfer or hand-off results to one or more other systems to investigate and/or evaluate upstream/downstream systems, modify upstream/downstream systems, or the like. For instance, in some examples, a data transfer control platform might not have clearance (e.g., sufficient security clearance or settings) to investigate and/or evaluate systems, devices, events, networks, or the like, occurring at upstream and/or downstream systems, devices, networks, or the like. Accordingly, the data transfer control platform may transfer interrogation duties to a second system (e.g., a second data transfer control platform), which may evaluate the upstream and/or downstream systems, devices, events, networks or the like. In some examples, the second system may determine and provide one or more data transfer instructions. In other examples, the second system may transmit results to the initial data transfer control platform to determine and provide one or more data transfer instructions.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A data transfer control platform, comprising:
   one or more processors;
   a communication interface communicatively coupled to the one or more processors; and
   memory storing computer-executable instructions that, when executed by the one or more processors, cause the data transfer control platform to:
   detect a data transfer between a data source computing device located remotely from the data transfer control platform and a data destination computing device located remotely from the data transfer control platform;
   determine based on a security clearance of the data transfer control platform, whether the data transfer control platform is authorized to investigate data transfer conditions associated with the data transfer;
   responsive to determining that the data transfer control platform is not authorized to investigate the data transfer conditions associated with the data transfer:
   transmit an instruction to an alternate data transfer control platform to evaluate the data transfer conditions associated with the data transfer; and
   receive, from the alternate data transfer control platform, a first data transfer condition;
   responsive to determining that the data transfer control platform is authorized to investigate the data transfer conditions associated with the data transfer, evaluate a second data transfer condition associated with the data transfer;
   determine a data transfer instruction based, at least in part, on one of: the first data transfer condition and the second data transfer condition; and
   provide, via the communication interface to the data source computing device, the data transfer instruction wherein receipt of the data transfer instruction at the data source computing device causes the data source computing device to transfer data in accordance with the data transfer instruction.

2. The data transfer control platform of claim 1, wherein:
the data transfer instruction indicates a scheduled time at which the data source computing device should transfer the data to the data destination computing device, the scheduled time being determined based on the one of: the first data transfer condition and the second data transfer condition.

3. The data transfer control platform of claim 2, wherein:
the one of: the first data transfer condition is an optimal time at which to perform the data transfer; and
the computer-executable instructions, when executed, further cause the data transfer control platform to:
analyze a machine learning dataset to identify the optimal time wherein the machine learning dataset comprises historical data transfer information characterizing one or more previous data transfers, and
select the optimal time as the scheduled time of the data transfer instruction.

4. The data transfer control platform of claim 1, wherein:
the data transfer instruction indicates a size of a portion of the data the data source computing device should transfer to the data destination computing device during each stage of a plurality of data transfer stages of the data transfer, the size being determined based on the one of: the first data transfer condition and the second data transfer condition.

5. The data transfer control platform of claim 4, wherein:
the one of: the first data transfer condition and the second data transfer condition is an available storage capacity at the data destination computing device; and
the size is a file size of the portion of the data.

6. The data transfer control platform of claim 4, wherein:
the one of: the first data transfer condition and the second data transfer condition is a processing throughput associated with the data destination computing device; and
the size is a number of data items to be processed by the data destination computing device.

7. The data transfer control platform of claim 6, wherein the processing throughput includes at total amount of transactions to be processed at a time.

8. The data transfer control platform of claim 1, wherein:
the data transfer instruction indicates an alternative data destination computing device to which the data source computing device should transfer the data instead of the data destination computing device.

9. The data transfer control platform of claim 8, wherein:
the one of: the first data transfer condition and the second data transfer condition is a measurement of a utilization of a computing resource at the data destination computing device; and
the data transfer instruction is determined in response to a determination that the measurement of the utilization of the computing resource is not within a predetermined measurement threshold.

10. The data transfer computing platform of claim 1, wherein:
the data transfer instruction indicates a network path along which the data source computing device should transfer the data to the data destination computing device.

11. The data transfer computing platform of claim 10, wherein:
the one of: the first data transfer condition and the second data transfer condition is a measurement of a network condition associated with a network used to transfer the data; and
the data transfer instruction is determined based on a comparison of the measurement of the network condition to a predetermined measurement threshold.

12. The data transfer computing platform of claim 1, wherein:
the one of: the first data transfer condition and the second data transfer condition is an importance level associated with the data;
the computer-executable instructions, when executed, further cause the data transfer control platform to:
determine to pause the data transfer based on the importance level;
initiate a pause of the data transfer; and
initiate a resume of the data transfer in response to determining that the data has been transferred to the data destination computing device.

13. The data transfer computing platform of claim 12, wherein:
the importance level comprises a priority of the data.

14. The data transfer computing platform of claim 12, wherein:
the importance level comprises a deadline at which the data should be transferred to the data destination computing device.

15. The data transfer computing platform of claim 1, wherein:
the data transfer computing platform resides at the data source.

16. A method, comprising:
by a data transfer control platform comprising one or more processors, memory, and a communication interface:
detecting, by the one or more processors, a data transfer between a data source computing device located remotely from the data transfer control platform and a data destination computing device located remotely from the data transfer control platform;
determining, by the one or more processors and based on a security clearance of the data transfer control platform, whether the data transfer control platform is authorized to investigate data transfer conditions associated with the data transfer;
when it is determined that the data transfer control platform is not authorized to investigate the data transfer conditions associated with the data transfer:
transmitting, by the one or more processors, an instruction to an alternate data transfer control platform to evaluate the data transfer conditions associated with the data transfer; and
receiving, by the one or more processors and from the alternate data transfer control platform, a first data transfer condition;
when it is determined that the data transfer control platform is authorized to investigate the data transfer conditions associated with the data transfer, evaluating, by the one or more processors, a second data transfer condition associated with the data transfer;
determining, by the one or more processors, a data transfer instruction based, at least in part, on one of: the first data transfer condition and the second data transfer condition; and
providing, via the communication interface to the data source computing device, the data transfer instruction wherein receipt of the data transfer instruction at the data source computing device causes the data source computing device to transfer data in accordance with the data transfer instruction.

17. The method of claim 16, wherein:
the one of: the first data transfer condition and the second data transfer condition is an optimal time at which to perform the data transfer; and
the data transfer instruction indicates a scheduled time at which the data source computing device should transfer the data to the data destination computing device, the scheduled time being determined based on the optimal time.

18. The method of claim 16, wherein:
the data transfer instruction indicates a size of a portion of the data the data source computing device should transfer to the data destination computing device during each stage of a plurality of data transfer stages of the data transfer, the size being determined based on the one of: the first data transfer condition and the second data transfer condition; and
the one of: the first data transfer condition and second data transfer condition is one of: a utilization of a computing resource at the data destination computing device and a processing throughput associated with the data destination computing device.

19. The method of claim 16, wherein:
the one of: the first data transfer condition and the second data transfer condition is a measurement of a network condition associated with a network used to transfer the data; and
the data transfer instruction is determined based on the measurement of the network condition.

20. The method of claim 16, wherein:
the one of: the first data transfer condition and the second data transfer condition is an importance level associated with the data; and
the data transfer instruction is determined based on the importance level.

21. Non-transitory computer-readable media storing computer-executable instructions that, when executed by a data transfer control platform comprising one or more processors, memory, and a communication interface, cause the data transfer control platform to:
detect a data transfer between a data source computing device located remotely from the data transfer control platform and a data destination computing device located remotely from the data transfer control platform;
determine based on a security clearance of the data transfer control platform, whether the data transfer control platform is authorized to investigate data transfer conditions associated with the data transfer;
responsive to determining that the data transfer control platform is not authorized to investigate the data transfer conditions associated with the data transfer:
transmit an instruction to an alternate data transfer control platform to evaluate the data transfer conditions associated with the data transfer; and
receive, from the alternate data transfer control platform, a first data transfer condition;
responsive to determining that the data transfer control platform is authorized to investigate the data transfer conditions associated with the data transfer, evaluate a second data transfer condition associated with the data transfer;
determine a data transfer instruction based, at least in part, on one of: the first data transfer condition and the second data transfer condition; and
provide, via the communication interface to the data source computing device, the data transfer instruction wherein receipt of the data transfer instruction at the data source computing device causes the data source computing device to transfer data in accordance with the data transfer instruction.

22. The non-transitory computer-readable media of claim 21, wherein:
the one of: the first data transfer condition and the second data transfer condition is an optimal time at which to perform the data transfer; and
the data transfer instruction indicates a scheduled time at which the data source computing device should transfer the data to the data destination computing device, the scheduled time being determined based on the optimal time.

23. The non-transitory computer-readable media of claim 21, wherein:
the data transfer instruction indicates a size of a portion of the data the data source computing device should transfer to the data destination computing device during each stage of a plurality of data transfer stages of the data transfer, the size being determined based on the data transfer conditions; and
the one of: the first data transfer condition and the second data transfer condition is one of: a utilization of a computing resource at the data destination computing device and a processing throughput associated with the data destination computing device.

24. The non-transitory computer-readable media of claim 21, wherein:
the one of: the first data transfer condition and the second data transfer condition is a measurement of a network condition associated with a network used to transfer the data; and
the data transfer instruction is determined based on the measurement of the network condition.

25. The non-transitory computer-readable media of claim 21, wherein:
the one of: the first data transfer condition and the second data transfer condition is an importance level associated with the data; and
the data transfer instruction is determined based on the importance level.

* * * * *